United States Patent
Aupperle et al.

(10) Patent No.: US 7,426,642 B2
(45) Date of Patent: Sep. 16, 2008

(54) INTEGRATING LEGACY APPLICATION/DATA ACCESS WITH SINGLE SIGN-ON IN A DISTRIBUTED COMPUTING ENVIRONMENT

(75) Inventors: Bryan E. Aupperle, Cary, NC (US); Julie H. King, Raleigh, NC (US); Sridhar R. Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 958 days.

(21) Appl. No.: 10/294,370

(22) Filed: Nov. 14, 2002

(65) Prior Publication Data
US 2004/0098595 A1    May 20, 2004

(51) Int. Cl.
*H04L 9/00* (2006.01)
(52) U.S. Cl. .............................. 713/185; 709/227; 726/8
(58) Field of Classification Search ..................... 713/1, 713/2, 188, 194, 185, 155, 200, 201; 380/200, 380/201, 255, 277; 726/2, 8; 709/227
See application file for complete search history.

(56) References Cited

U.S. PATENT DOCUMENTS

| | | | |
|---|---|---|---|
| 6,061,516 A | 5/2000 | Yoshikawa et al. | |
| 6,178,511 B1 * | 1/2001 | Cohen et al. | 726/6 |
| 6,434,628 B1 * | 8/2002 | Bowman-Amuah | 714/48 |
| 6,460,141 B1 * | 10/2002 | Olden | 726/4 |
| 6,609,198 B1 * | 8/2003 | Wood et al. | 713/155 |
| 2003/0033535 A1 * | 2/2003 | Fisher et al. | 713/185 |
| 2003/0074580 A1 * | 4/2003 | Knouse et al. | 713/201 |
| 2003/0158945 A1 * | 8/2003 | Liu | 709/227 |
| 2003/0163733 A1 * | 8/2003 | Barriga-Caceres et al. | 713/201 |
| 2003/0182551 A1 * | 9/2003 | Frantz et al. | 713/170 |

OTHER PUBLICATIONS

*WebSphere Host On-Demand*, [web-published article], <http://www-3.ibm.com/software/webservers/hostondemand/>, [Oct. 18, 2002].
*WebSphere software platform*, [web-published article], <http://www-3.ibm.com/software/info1/websphere/index.jsp?tab=news/ibmnews/pr092 502/>, [Oct. 8, 2002].
*Base Administrator's Guide, Access Manager Overview*, [web-published manual], <http://www.tivoli.com/support/public/Prodman/public_manuals/td/ITAME/GC23-4684-00/en_US/HTML/adminmst04.htm>, Oct. 18, 2002.

* cited by examiner

*Primary Examiner*—Joseph Pan
(74) *Attorney, Agent, or Firm*—Jeanine Ray-Yarletts, Esq.; Steven M. Greenberg, Esq.; Carey Rodriguez Greenberg & Paul LLP

(57) ABSTRACT

The present invention provides methods, systems, computer program products, and methods of doing business whereby legacy host application/system access is integrated with single sign-on in a modem distributed computing environment. A security token used for signing on to the modem computing environment is leveraged, and is mapped to user credentials for the legacy host environment. These user credentials are programmatically inserted into a legacy host data stream, thereby giving the end user the look and feel of seamless access to all applications/systems, including not only modem computing applications/systems but also those residing on (or accessible through) legacy hosts. In addition to providing users with the advantages of single sign-on, the disclosed techniques enable limiting the number of user identifiers and passwords an enterprise has to manage.

10 Claims, 19 Drawing Sheets

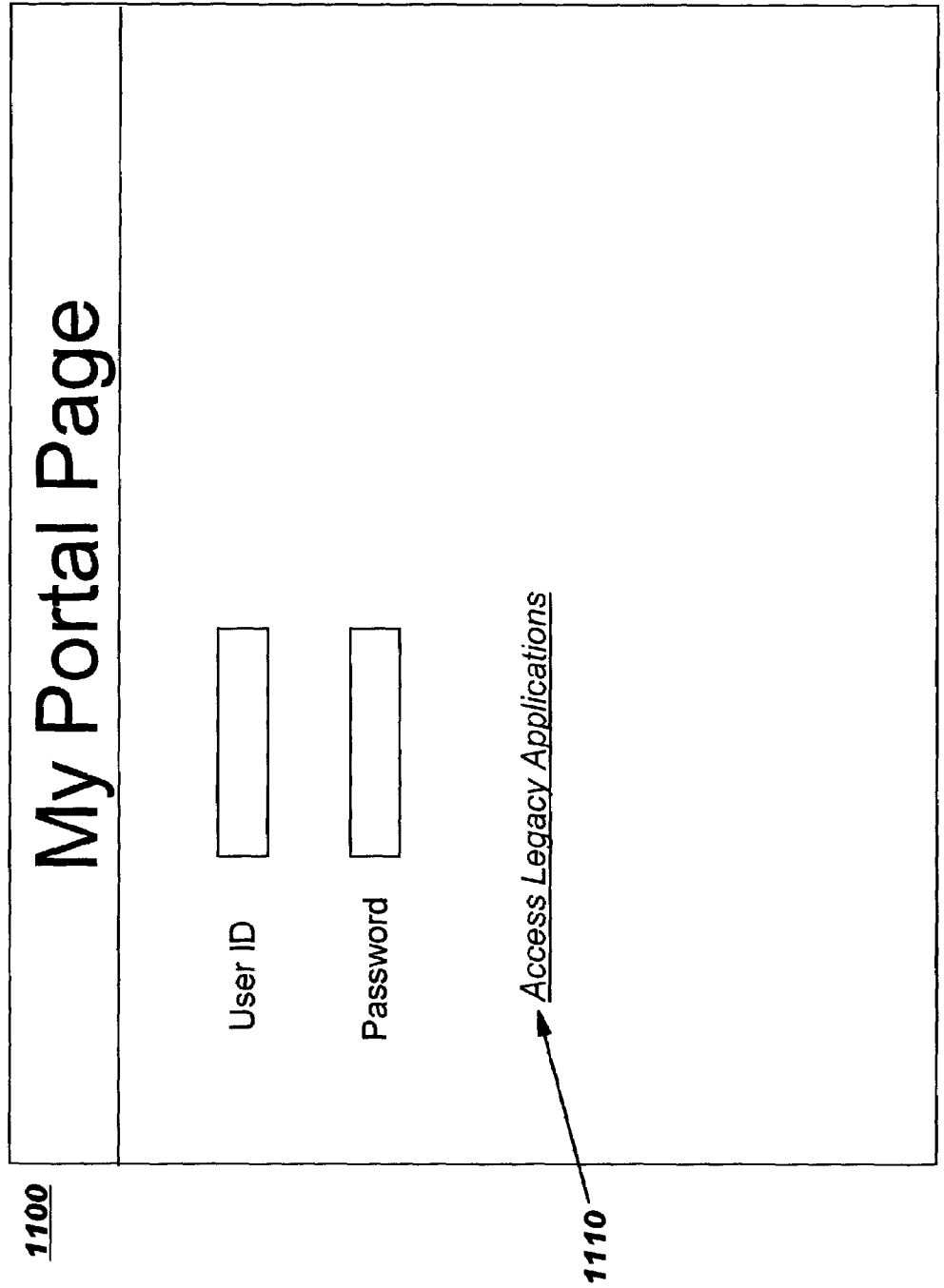

FIG. 12A

```
1200  HTTP/1.1 200 OK
1205  Content-Type: text/html
1210  UserID: xyzzy
1215  Ticket: a1s2d3f4
```

FIG. 12B

1220 <META HTTP-EQUIV="UserID" CONTENT="xyzzy" />
1225 <META HTTP-EQUIV="Ticket" CONTENT="a1s2d3f4" />

FIG. 12C

1230 <META NAME="UserID" VALUE="xyzzy" />
1235 <META NAME="Ticket" VALUE="a1s2d3f4" />

FIG. 12D

```
<BODY>
  :
1240  <! UserID: xyzzy -- currently-signed-on user >
1245  <! Ticket: a1s2d3f4>
  :
```

FIG. 12E

1250 `<PARAM NAME="UserID" VALUE="xyzzy">`
1255 `<PARAM NAME="Ticket" VALUE="a1s2d3f4">`

FIG. 12F

```
<?xml version "1.0" encoding="UTF-8"?>
<SOAP-ENV:Envelope
    SOAP-ENV:encodingStyle="http://schemas.xmlsoap.org/soap/encoding/"
    xmlns:xsd="http://www.w3.org/2001/XMLSchema"
    xmlns:SOAP-ENV="http://schemas.xmlsoap.org/soap/envelope/"
    xmlns:xsi="http://www.w3.org/2001/XMLSchema-instance">
    <SOAP-ENV:Body>
        <getCred>
            <arg0 xsi:type="xsd:string">myserver.ibm.com</arg0>
            <arg1 xsi:type="xsd:string">ralvm17</arg1>
            <arg2 xsi:type="xsd:string">xyzzy</arg2>
        </getCred>
    </SOAD-ENV:Body>
</SOAP-ENV:Envelope>
```

- 1260 → `<SOAP-ENV:Envelope`
- 1265 → `<getCred>`

FIG. 12G

```
<?xml version "1.0" encoding="UTF-8"?>
<SOAP-ENV:Envelope
    SOAP-ENV:encodingStyle="http://schemas.xmlsoap.org/soap/encoding/"
    xmlns:xsd="http://www.w3.org/2001/XMLSchema"
    xmlns:SOAP-ENV="http://schemas.xmlsoap.org/soap/envelope/"
    xmlns:xsi="http://www.w3.org/2001/XMLSchema-instance">
    <SOAP-ENV:Body>
        <getCredResponse>
            <getCredResult xsi:type="xsd:string">xyzzy a1s2d3f4</getCredResult>
        </getCredResponse>
    </SOAD-ENV:Body>
</SOAP-ENV:Envelope>
```

- 1270 → `<SOAP-ENV:Envelope`
- 1275 → `<getCredResponse>`
- 1280 → `<getCredResult xsi:type="xsd:string">xyzzy a1s2d3f4</getCredResult>`

INTEGRATING LEGACY APPLICATION/DATA ACCESS WITH SINGLE SIGN-ON IN A DISTRIBUTED COMPUTING ENVIRONMENT

RELATED INVENTIONS

The present invention is related to U.S. Pat. No. 6,823,452 (Ser. No. 09/466,625, filed Dec. 17, 1999), titled "Providing End-to-End User Authentication for Host Access Using Digital Certificates"; U.S. Pat. No. 6,934,848 (Ser. No. 09/619,205, filed Jul. 17, 1999), titled "Technique for Handling Subsequent User Identification and Password Requests within a Certificate-Based Host Session"; and U.S. Pat. No. 6,976,164 (Ser. No. 09/619,912, filed Jul. 19, 1999), titled "Technique for Handling Subsequent User Identification and Password Requests with Identity Change within a Certificate-Based Host Session". These U.S. Patents are commonly assigned to the International Business Machines Corporation ("IBM") and are hereby incorporated herein by reference.

BACKGROUND OF THE INVENTION

1. Field of the Invention

The present invention relates to computer systems, and deals more particularly with methods, systems, computer program products, and methods of doing business wherein legacy application/data access is integrated with single sign-on in a modern distributed computing environment (such as the public Internet).

2. Description of the Related Art

One of the challenges that continues to confront information services ("IS") professionals is the difficulty of integrating legacy mainframe host applications and data with modern computing environments and their modern user interfaces. In particular, it is necessary to extend the reach of many legacy applications such that they can be accessed through the Internet and in World Wide Web-enabled environments (for example, for business-to-business or "B2B" use and/or for business-to-consumer or "B2C" use). (The term "Web" is used hereinafter to refer to the World Wide Web as well as the Internet, for ease of reference.)

As is known in the art, most legacy host applications present their data through text-based user interfaces designed for use on specific, obsolete character-based terminals, whereas modern end-user devices almost universally support graphical user interfaces. The legacy applications were typically written with this character-based terminal presentation space as the only interface format in which the host data output is created, and in which host data input is expected. ("Presentation space" is a term used abstractly to refer to the collection of information that together comprises the information to be displayed on a user interface screen, as well as the control data that conveys how and where that information is to be presented.)

Typical character-based terminals are those from the IBM® Model 327x family (such as a Model 3277, 3279, etc.). ("IBM" is a registered trademark of International Business Machines Corporation.) The Model 3277 terminal, for example, was designed to display information in a matrix of characters, where the matrix consisted of 24 rows each having 80 columns. When programs were written expecting this display format, programmers would specify placement of information on the screen using specific row and column locations. Information formatted for this display is sent as a "data stream" to the mechanism in the display hardware that is responsible for actually displaying the screen contents. The phrase "data stream" refers to the fact that the data is sent as a linear string, or stream, of characters. This stream of characters contains both the actual textual information to be displayed on the screen, as well as information specifying where and how the text is to be displayed. "Where" consists of the row and column where the text is to begin, and "how" comprises a limited number of presentation attributes such as what color to use when displaying that text, the color of the background, etc.

Data processing systems, methods, and computer program products that use the 3270 data stream architecture have been widely used for decades. The 3270 data stream architecture has been so widely used that it has become a de facto standard format, and consequently, systems and application using the 3270 data stream architecture are often referred to as "legacy" systems and "legacy" applications (or equivalently, "legacy host systems" and "legacy host applications").

An example of a legacy host application is IBM's CICS® transaction server. An example of a legacy host system is a legacy database system, such as IBM's IMS® database system. ("CICS" and "IMS" are registered trademarks of IBM.) Hereinafter, the phrases "legacy host application", "legacy application", and "host application" are used interchangeably, and are intended to refer equivalently to legacy host systems (or the data accessed through such applications or systems).

The IBM Model 525x family includes different types of character-based terminals. These terminals display data in a slightly different manner from the IBM 327x models, and consequently use a different data stream format. The "5250 data stream" also became a de facto standard format for displays having similar characteristics.

A third type of data stream format commonly used by legacy host applications is referred to simply as an "ASCII data stream" (or equivalently as a Virtual Terminal, or "VT", data stream). While an ASCII data stream is not formatted for a specific model of display screen, a data stream in this format has certain predefined characteristics (for example, the manner in which a control character indicates the line spacing to be used).

The displays used with modern computer devices (including personal computers, handheld computing devices, network computers, and other types of computers, referred to hereinafter as "workstations" for ease of reference) support graphics and video, in addition to text characters, as is well known. These displays do not use a character-based row and column matrix approach to screen layout. Instead, an application program in this environment has access to thousands of tiny display elements, allowing the various types of information to be placed virtually anywhere on the display screen.

When a modern computer workstation is used to access a legacy host application running on a mainframe or a server, the output data created by that host application is often still formatted as one of the character-based data stream formats. It is therefore necessary to convert between the character-based data stream format sent from, and expected by, the legacy application (using the presentation space for transferring data) and a format that is usable by the modern user interface.

This problem has been recognized for a number of years, and consequently, a number of products and techniques have been developed. It became clear early on that rewriting the legacy applications was not a viable approach in many situations, for a number of reasons (including lack of the required programming skills, the considerable time and expense that would be involved, lack of access to the legacy source code, etc.). Thus, most modern workstations communicate with legacy host applications by relying on other products to perform transformations of the data streams.

In particular, one of the more common ways for integrating legacy host applications with modem computing environments is to use software emulation or an emulator product to allow communication between the distributed computing environment and the host application. Emulators perform transformations on data streams so that communication can occur; these techniques are well known in the art, and will not be described in detail herein. For purposes of discussion herein, is it assumed that an emulator product implementing the Telnet 3270 ("TN3270") emulation protocol may be used. The TN3270 protocol is used to provide emulation of the 3270 data stream, as is well known to those familiar with the art. (Note that the TN3270 protocol is used by way of illustration only: the novel techniques of the present invention are not limited to scenarios using the TN3270 protocol or to use of TN3270 emulators.)

Many host applications and their data have, from their origin, been protected through the use of a host access control facility or host access agent, or other similar mainframe-based security systems (referred to generally herein as "host access agents"). A widely-used host access agent is the program product commonly referred to as "Resource Access Control Facility", or "RACF®". ("RACF" is a registered trademark of IBM.) These mainframe-based host access agents typically require users to provide a user identifier ("user ID") and password in order to gain access to the protected host applications and data. The user ID and password are normally used to authenticate the user and determine what access privileges are authorized for that user; this process is sometimes referred to as determining the user's "credentials".

When a user wants to access data or legacy applications on a host mainframe from a client workstation over a network connection in a modern computing environment, the user normally must provide a separate user ID and password to the host application to satisfy the security requirements of the host access agent, in addition to the user ID and password the user supplies for accessing the modem environments (e.g., to access the Internet or Web). This double entry of identifying information causes user frustration, and is time-consuming and inefficient. Storing multiple sets of user ID and password information for users, and making sure that changes are synchronized and propagated to each set when necessary, also places a heavy administrative burden on an enterprise.

It is preferable to provide users (whether human or programmatic) with seamless authentication and authorization for using multiple applications within a single user session, where this seamless user identification requires the user to identify himself only once per user session. This is commonly referred to as "single sign-on". In addition to eliminating the need for users to provide identifying information multiple times, single sign-on will enable minimizing the number of different user IDs and passwords a user must create and remember, and will reduce the administrative burden of maintaining security (e.g., by reducing the number of requests for an administrator to reset a forgotten password) for password-protected applications and data.

Ideally, single sign-on should allow a user to access all of his Internet-based applications, as well as applications that provide access to legacy host applications and/or data. Examples of applications that allow the user to access legacy host applications include IBM's Host-On-Demand, Personal Communications, and Host Publisher products; the way in which users identify themselves to these products should be consistent with how they do so with other Web applications.

Enterprises have recently started providing host access through products such as these, whereby emulators are accessible from a Web location (rather than requiring each workstation user to install emulator software on his own workstation). Enterprises are also deploying technology that provides single sign-on capability for Web-based applications, whereby a user identifies himself when signing on to a Web site, and this identification seamlessly carries through to other Web-based applications using a session-based security token created during an initial secure sign-on. For example, the Secure Sockets Layer protocol, or "SSL", may be used when the client workstation establishes a secure connection to a Web server. The user's identifying information may be obtained from a security token created during this exchange, and may then be used to seamlessly and transparently identify the user to other Web-based applications. This technology is found in commercially-available products such as Tivoli® Access Manager, from IBM, and Netegrity SiteMinder®, a product of Netegrity, Inc. ("Tivoli" is a registered trademark of Tivoli Systems, Inc., and "SiteMinder" is a registered trademark of Netegrity, Inc.)

It is desirable to use this same session-based security token to grant secure access to legacy host applications, thereby realizing advantages of single sign-on for all applications a user might access within a single session. However, host access agents such as RACF do not understand Web security tokens. Accordingly, what is needed are techniques for integrating legacy host application access with single sign-on in distributed computing environments, and in particular, in environments where the initial sign-on uses a Web security token.

SUMMARY OF THE INVENTION

An object of the present invention is to provide techniques for integrating legacy host application access with single sign-on in distributed computing environments.

Another object of the present invention is to provide these techniques wherein a security token from an initial Web sign-on is used to seamlessly and transparently authenticate a user for access to one or more legacy host applications.

A further object of the present invention is to provide these techniques without requiring any modification to existing legacy host applications.

Still another object of the present invention is to provide these techniques without requiring any modification to existing legacy host access agents.

Another object of the present invention is to provide techniques that enable seamlessly and transparently changing from accessing one legacy host application to accessing another legacy host application which requires a different set of credentials, within the scope of a single secure session.

Still another object of the present invention is to provide techniques that enable users to conveniently yet securely access protected legacy host applications, without having to manually provide their security credentials multiple times during a single user session.

An additional object of the present invention is to provide techniques that enable users to conveniently and securely access protected legacy host applications and Web-based applications within a single user session, without having to manually provide their security credentials multiple times.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides computer program products, systems, and methods for integrating legacy host application access with single sign-on in distributed computing environments. In preferred embodiments, this technique preferably comprises: establishing a first secure session from a client on a user's workstation to a server, wherein the secure session establishment authenticates the user's identity from identifying information passed from the client; storing the identifying information in a security token accessible to the server; and using the identifying information stored in the security token to authenticate the user for access to a legacy host application or system, whereby the authentication occurs programmatically and does not require the user to re-enter his identifying information.

Using the identifying information may further comprise: requesting a legacy host access agent to generate a password substitute, based on the user's identifying information from the security token and an identifier of the legacy host application or system; passing the password substitute and a legacy host identifier of the user to the client on the user workstation; establishing a second secure session between an emulator client operating on the user's workstation and an emulator server on a host where the legacy host application or system will be accessible; receiving a sign-on data stream from the legacy host application or system at the emulator client over the second secure session; programmatically inserting the password substitute and the legacy host identifier into the sign-on data stream, creating a modified data stream; returning the modified data stream from the emulator client to the emulator server, over the second secure session; and sending, by the legacy host application or system, the password substitute and the legacy host identifier to the legacy host access agent for transparently authenticating the user.

The emulator client may be downloaded dynamically to the user workstation, responsive to determining that the user wishes to execute legacy host applications and/or systems.

Rather than requesting a legacy host access agent to generate a password substitute, the user's password may be retrieved from secure storage over a trusted secure connection, based on the user's identifying information from the security token and an identifier of the legacy host application or system, and this password may be used in place of the password substitute.

Rather than passing the password substitute and a legacy host identifier of the user to the client on the user workstation, they may be passed to an emulator client at the server, where this emulator client operates as a proxy for the client on the user's workstation, and rather than establishing a second secure session between an emulator client operating on the user's workstation and an emulator server on a host, the second secure session may be established between the emulator client and an emulator server on a host where the legacy host application or system will be accessible. This approach may also be used where the user's password replaces the password substitute.

Techniques of the present invention may also be used advantageously in various methods of doing business. For example, access software may be developed that provides the advantageous features disclosed herein, and this software may be marketed under various revenue models, including monthly subscriptions (or other periodic subscriptions), pay-per-use, etc.

The present invention will now be described with reference to the following drawings, in which like reference numbers denote the same element throughout.

BRIEF DESCRIPTION OF THE DRAWINGS

FIGS. 4-11 provide sample user interface ("UI") panels or screens that are used in describing operation of preferred embodiments;

FIGS. 12A-12E illustrate several manners in which user credentials can be passed as meta-data for use by an implementation of the present invention;

FIG. 12F shows how user credentials may be obtained in a Web services environment, and FIG. 12G shows how those credentials can be passed to a client for use by an implementation of the present invention.

DESCRIPTION OF THE PREFERRED EMBODIMENTS

Figure 1:
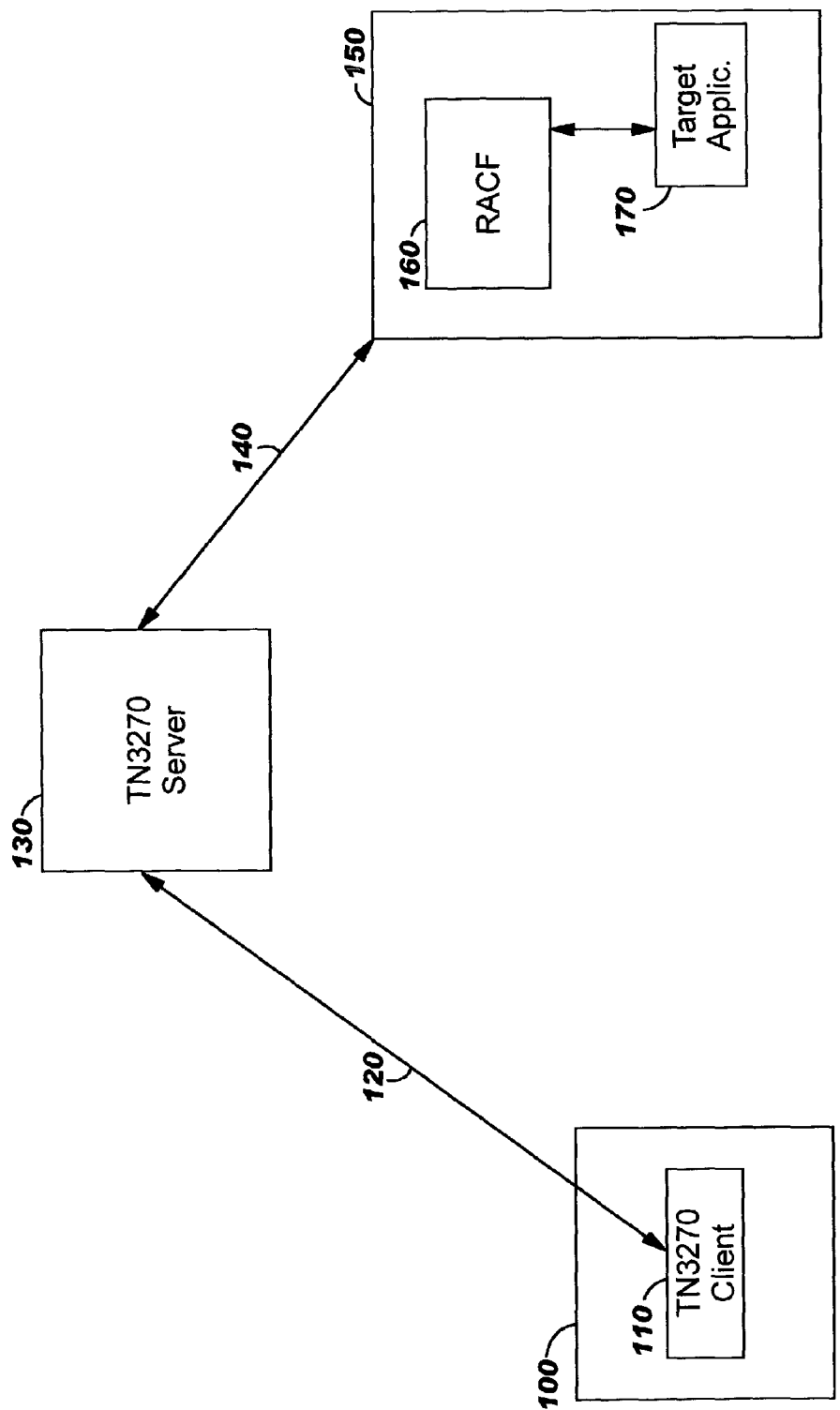
FIGS. 1 and 2 depict single sign-on approaches used in the prior art, and are based on use of digital certificates for identifying users.

The present invention defines techniques for granting user access to protected legacy host applications by leveraging security tokens created when establishing secure Web-based communications. Users can then seamlessly and securely access a plurality of modem Web applications and/or legacy host applications, within a single user session, without having to identify themselves multiple times. This secure access is provided transparently to the user, who no longer has to maintain separate passwords and user IDs for accessing legacy host applications.

As stated earlier, host access agents such as RACF do not understand all types of session-based security tokens used for authenticating users who sign on in a modem distributed computing environment (referred to equivalently herein as a "Web environment"). In many cases, modifying the host access agent software is not a viable solution to this problem, for reasons which have been discussed earlier (including a shortage of qualified programmers and the huge redeployment effort that would be required). The present invention therefore defines a number of techniques whereby user credentials for the legacy applications can be automatically and transparently determined, using user-identifying information from session-based security tokens. The credentials for a legacy application are then automatically and transparently inserted into the 3270 data stream, in the correct location, and this data stream is sent to the legacy application. No change is required to the legacy application, which can establish a user session in an identical manner, without regard to whether the identifying information was manually provided by the user (as in the prior art) or whether this information was programmatically inserted using techniques disclosed herein.

Various approaches are defined, based on factors such as the capabilities of an access manager present in the computing environment and/or capabilities of a host access agent. These various approaches are described in detail below.

As used herein, the term "identifying information" refers to information that can be used to identify a user, such as a user ID, or analogous information such as a user name, and the term "identifying" a user refers to providing this type of user identifying information. "Authenticating" a user refers to validating a user's identifying information with reference to a password for that user, for example to ensure that the password which has been provided is a correct password for the user ID which has been provided. Once a user has been successfully authenticated, the user's authorization or access privileges can then be determined.

Preferred embodiments are described with reference to users establishing secure Web-based communications using the SSL protocol; however, this is by way of illustration and not of limitation. Alternative techniques include use of other secure protocols such as the Transport Layer Security ("TLS") protocol, which is an SSL follow-on having similar messages and capabilities.

Several commonly-assigned inventions disclose techniques for secure legacy host application access, using digital certificates. Digital certificates may be used to authenticate entities, as is well known in the art. Commonly-assigned U.S. Pat. No. 6,128,738, which is titled "Certificate Based Security in SNA Data Flows", teaches techniques whereby digital certificates are transported in appropriate Systems Network Architecture ("SNA") data flows between a client and a host for identifying the user to the legacy host application. The disclosed techniques require legacy applications to be modified such that they can understand and process the digital certificate (instead of the traditional user ID and password). The host access agent authenticates the user using this certificate, instead of using the user's ID and password. While this approach provides a number of advantages, it requires an enterprise to upgrade each of its application subsystems in order to achieve the benefits. So, for some enterprises, this approach may be impractical and unacceptable.

Commonly-assigned U.S. Pat. No. 6,823,452, titled "Providing End-to-End User Authentication for Host Access Using Digital Certificates" and referred to hereinafter as "the related invention", discloses techniques for using digital certificates to authenticate a client in order to allow the client to access legacy host applications, but does not require changes to the legacy host software. In preferred embodiments of the related invention, SSL or a similar security protocol is initially used to establish a secure connection between the client device and either a device functioning as a TN3270 server (in the first preferred embodiment) or a Web application server (in the second preferred embodiment). The client's digital certificate is required when establishing the SSL connection, according to the prior art SSL specification, to enable the TN3270 server or Web application server to authenticate the client. The related invention caches this certificate at the server, and uses it (in particular, the subject field, when using an X.509 certificate) to authenticate the client to the legacy host access agent. Once the host access agent has successfully authenticated the client, it returns a passticket (or similar password substitute) or password to the TN3270 server or Web application server. (The term "passticket" is used in RACF to denote a particular type of password substitute. Passtickets are described in more detail below.)

In the related invention, the TN3270 server or Web application server is also responsible for establishing an SNA session with the target host, on behalf of the client. Rather than requiring the user to re-enter his user ID and password to communicate with the protected legacy host system, the TN3270 server or Web application server automatically inserts the passticket and the corresponding user ID into the sign-on data stream that is sent to the target host application, enabling the user to be transparently yet securely signed on to the host system. (The related invention discloses an alternative aspect where the TN3270 server or Web application server provides the legacy host application with a user ID and an actual password which has been authenticated by a host access system, rather than a user ID and passticket, for those environments in which the passticket concept does not exist.)

Thus, implementations of the related invention enable users to access legacy host applications with a single sign-on by using the digital certificate with which the user established the secure session in the modern computing environment, and notably without requiring the user to re-identify himself.

The passtickets referenced in the related invention are credentials that are dynamically generated by RACF, using techniques which are known in the art, after a user's identity has been authenticated. Typically, the passticket generation process also considers the target host application, such that a passticket represents the user's credentials for that target host application. Passtickets are relatively short-lived: by default, a passticket is valid for only 20 seconds. Each passticket can only be used one time. Passtickets provide what is commonly referred to as the "RACF secured sign-on" capability, and are preferable over passwords in many cases because they allow clients to sign on to a host and communicate securely without sending RACF passwords across a network, thereby reducing security exposures.

Several preferred embodiments of the present invention are described with reference to using RACF passtickets. As an alternative to generating a passticket (for example, when using a host access agent or security system other than RACF), an actual password may be used directly, instead of using a passticket or other password substitute. Accordingly, embodiments are also described herein that use passwords rather than password substitutes. (Note that the term "passticket" as used herein should be interpreted as referring equivalently to other types of password substitutes.)

Commonly-assigned U.S. Pat. No. 6,934,848, titled "Technique for Handling Subsequent User Identification and Password Requests within a Certificate-Based Host Session" (referred to herein as "the re-identify invention"), and U.S. Pat. No. 6,976,164, titled "Technique for Handling Subsequent User Identification and Password Requests with Identity Change within a Certificate-Based Host Session" (referred to herein as "the identity change invention"), disclose techniques whereby subsequent sign-on credentials can be seamlessly provided within an ongoing user session. In the former case, the subsequent credentials are based on the same identifying information used for the earlier sign-on, and are used to automatically re-identify the user. In the latter case, the subsequent credentials are based on different identifying information.

As an example of when re-identification of a user, using identical security credentials, might be necessary, it may happen that a legacy application is written such that it repeats the sign-on process to re-verify the user after occurrence of particular situations (such as an outage of some sort, a dormancy in session activity, etc.). As another example, the user may wish to change from using one legacy host application to using another legacy application. Each legacy application typically begins by sending a sign-on screen to the user, with the intent of prompting the user to enter his user ID and password. Even though the user's ID and password might be identical for both legacy applications, prior art techniques did not allow for a subsequent secure sign-on without tearing down the SSL session and repeating the secure session establishment. The techniques disclosed in the re-identify invention solved this problem, providing for the user's credentials to be re-supplied programmatically.

As an example of when re-identification of a user, using different security credentials, might be necessary, it may happen that different security credentials are required for a user when he wishes to change from using one legacy host application to using a different legacy application. As another example, the different security credentials might belong to a different user. Suppose that the current legacy host application user is processing some type of transaction and reaches a point where the transaction requires supervisory authority. For the transaction to complete, the user's supervisor may need to sign on to the legacy application temporarily. Because establishing a secure connection between the client and the TN3270 server or Web application server using a security protocol such as SSL is relatively expensive in terms of computation and networking resources, the performance overhead incurred in re-starting the session in order to supply a different certificate that signifies different user credentials makes the re-starting approach a less-than-optimal solution. Thus, the identity change invention defines techniques for transparently, programmatically changing the user credentials within the scope of an on-going secure session.

As mentioned earlier, the commonly-assigned patents which have been discussed leverage digital certificates for obtaining a user's credentials. The present invention, on the other hand, does not use digital certificates. Instead, the present invention uses a security token such as that which is created (using prior art techniques) during establishment of an SSL session. It should be noted, however, that in alternative embodiments, the user's identifying information may be obtained from additional or different sources. For example, cookies are used in many Hypertext Transfer Protocol ("HTTP") implementations to retain state-based information about an ongoing user session. Cookies may, in some cases, contain identifying information about a user (such as the user's ID) that can be leveraged for authenticating the user (and then obtaining user credentials for the authenticated user, using techniques of the present invention).

The techniques of the present invention differ in several other ways from the techniques disclosed in the commonly-assigned inventions. These differences will be apparent to one of skill in the art. A brief discussion of the related invention will now be provided, for contrasting with the techniques of the present invention.

Figure 2:
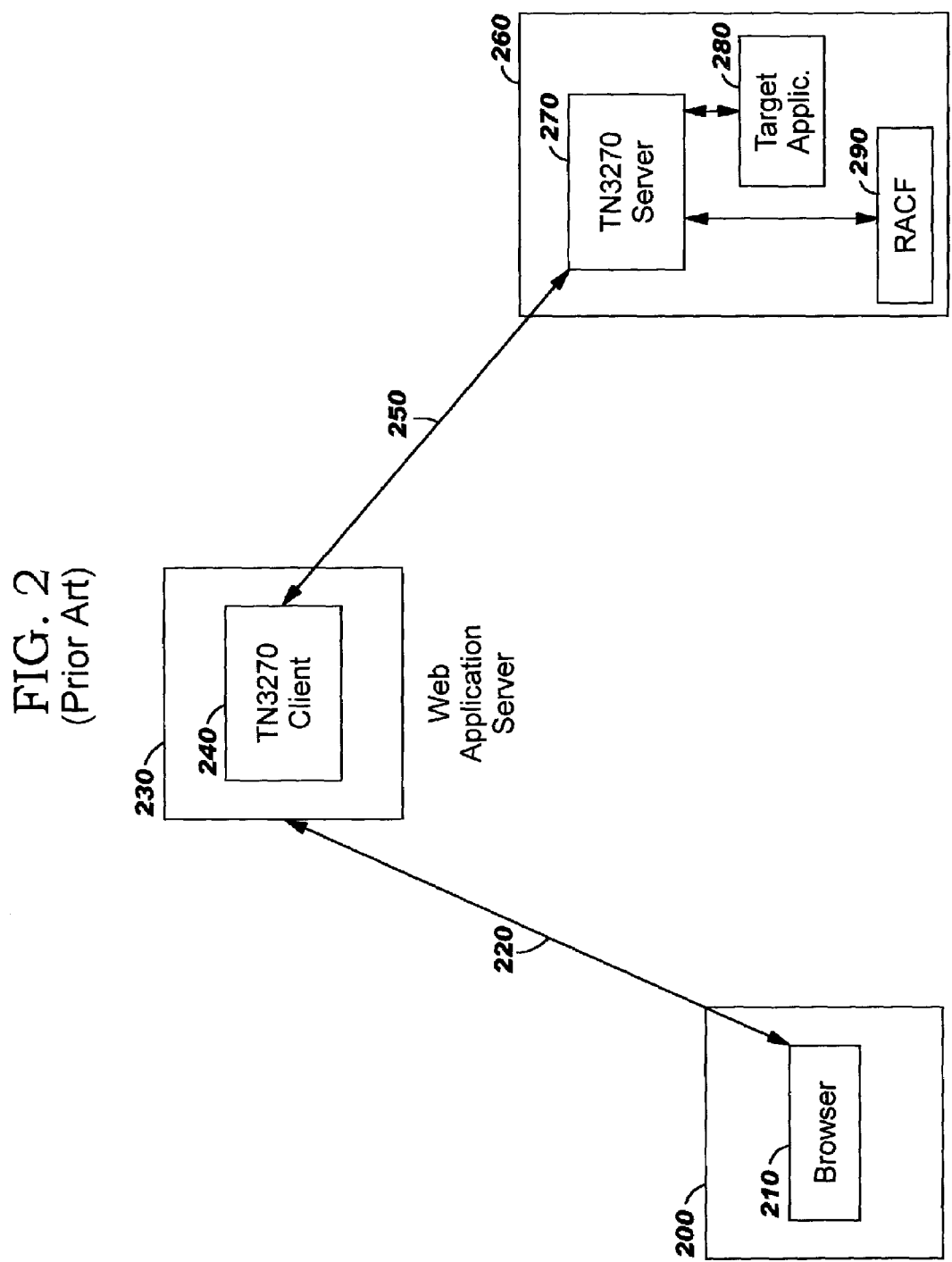

FIG. 1 illustrates components used in a first preferred embodiment of the related invention, and FIG. 2 illustrates components used in a second preferred embodiment. In the first preferred embodiment, an emulator client 110 (illustrated in the figure as a TN3270 client) is installed on, and executes on, a client workstation 100. This emulator client uses a security protocol such as SSL to initiate a secure connection 120 to a TN3270 server 130. (The connection establishment process is typically triggered in response to the workstation user requesting a secure host access session.)

During the connection establishment process, the user's digital certificate (or a reference thereto) is transmitted to the TN3270 server, and the TN3270 server uses this certificate to authenticate the workstation user. If the user's identity is successfully authenticated, the TN3270 server caches the digital certificate for later use.

The TN3270 client and TN3270 server then negotiate various Telnet services that are to be used on the secure host access session (using techniques which do not form part of the present invention). Since the TN3270 client wishes to interact with the host system 150, the TN3270 server opens an SNA session (or similar host access session) with that target host system over connection 140, on behalf of the TN3270 client. The target host then responds by sending a 3270 data stream containing initial application data to the TN3270 server. This initial data from the target host is typically some type of sign-on screen asking for a user ID and password. Upon receiving this 3270 data stream, the TN3270 server transforms it to a data stream suitable for sending to the TN3270 client (such as a standard TN3270 data stream), and forwards this transformed data stream to the TN3270 client.

The TN3270 client software on workstation 100 then responds to the TN3270 server with an indication that the user wishes to sign on to the host application. Rather than prompting the user to explicitly identify himself (for example, by typing in his user ID and password), the related invention automatically (and transparently to the user) inserts placeholders for the user ID and password in this response.

The TN3270 server is adapted for monitoring inbound client data for presence of the sign-on screen and placeholders in the 3270 data stream that is to be transmitted from the client. Upon detecting the presence of the placeholders, the TN3270 server locates the client's cached digital certificate, and passes this cached certificate to the host-based RACF software 160 over the established SNA session. The RACF system extracts the subject field of the client certificate, and uses this information to locate the user's stored credentials and access privileges. For example, the value of the subject field may be used as a key to access a stored repository of credentials, where the data in the repository has been previously created by a person such as a systems administrator. Or, the subject field may be used to access a lookup table of such information, or to access a lookup table which provides a correlation to a key used to access a credential repository (such as a subject value-to-credential key correlation, where the actual credentials are located using the credential key from the lookup table).

Now that the RACF implementation has the user's credentials, it invokes the RACF secured sign-on procedure, generating a passticket (using techniques which are known in the art). This passticket represents the access privileges for the user identified by the subject field of the digital certificate transmitted from the TN3270 server. The RACF software then returns this passticket to the TN3270 server, along with the user name to which it corresponds (i.e., the user name from the subject field, who is associated with the credentials represented by the passticket). The TN3270 server then inserts the returned user name and passticket into the 3270 data stream in place of the placeholders, thereby programmatically completing the sign-on request message sent from the TN3270 client software. The TN3270 server then transforms the data stream containing this completed message into a 3270 data stream, and sends that data stream to the target host application 170.

Using the passticket and user identification data from this 3270 data stream, the legacy host application can determine whether the user's access privileges are valid, without requiring the legacy host application to change. In particular, the legacy host application sends the credentials to RACF, and RACF determines whether these credentials are valid. If so, the host application 170 and the TN3270 client 110 then interact by transmitting messages securely over connections 120, 140.

In a second preferred embodiment of the related invention, illustrated in FIG. 2, a browser 210 executes on the client workstation 200. This browser communicates with a Web application server 230 to establish an SSL session or similar secure connection 220. The client's digital certificate is transmitted to the Web application server in this process, and the Web application server authenticates the client using this digital certificate (as in the prior art) and then caches the certificate for later use. Since the client desires to interact with the host system 260, a TN3270 client 240 executing on the Web application server initiates a TN3270 session (for purposes of illustration, using the TN3270 emulation protocol) over a connection 250 to a TN3270 server 270 executing on the target host system 260. The initial 3270 data stream application data then flows from the target host application 280, through the TN3270 server 270 and back to the TN3270 client 240 on Web application server 230.

Note that in this embodiment, the Web application server is functioning as a proxy for client 200, intercepting and responding to messages from target server 260 on behalf of the client software. Thus, the Web application server is responsible for transforming TN3270 data streams sent from the target application into Hypertext Markup Language ("HTML") or a similar Web page format, sending the HTML data to the client, receiving the client's response, transforming that response into a TN3270 data stream, and forwarding that TN3270 data stream to TN3270 server 270. The TN3270 server is responsible for converting between the TN3270 data stream format and 3270 data stream format, and for providing 3270 data stream messages to and from target application 280, thereby enabling the Web proxy to communicate with the target application.

When the Web proxy receives the initial application data on the TN3270 session, which is typically a sign-on request sent by the target host application (e.g., as a USSMSG10 message), the Web proxy responds by automatically sending the cached client's certificate to the RACF implementation 290. RACF extracts a user name from the subject field of this certificate, locates the credentials for that user, and generates a passticket representing those credentials. RACF then returns the user name and passticket through the TN3270 server 270 to the Web application server. In response, the Web application server inserts the returned user name and passticket information into the 3270 data stream expected by the host application and sends that data stream to the host application over connection 250. Then, the legacy host application will contact RACF with the passticket and user name, requesting verification that these credentials identify a permitted user, and the verification process will normally succeed. The legacy host application can then allow the user at workstation 200 to access protected applications and/or data.

Returning now to discussion of the present invention, several preferred embodiments will be described with reference to the representative scenarios in FIGS. 3 through 17. In contrast to the related invention, embodiments of the present invention do not use digital certificates, and the deployment of the TN3270 client is different. In FIG. 1, the TN3270 client operates on the client workstation, where it has been previously installed. In FIG. 2, the TN3270 client operates on the Web application server. In embodiments of the present invention, the TN3270 client is similarly located on the client workstation or on the Web application server. According to preferred embodiments of the present invention, however, it is not necessary to preconfigure the client workstation for the TN3270 client, or to pre-install the TN3270 client software. Instead, the TN3270 client functionality is dynamically and automatically deployed to the client workstation in several preferred embodiments (and may also be dynamically deployed to the Web application server in other preferred embodiments).

In preferred embodiments, a user first establishes a secure session from a browser operating on a modem client workstation to a Web application server, for example by navigating to a sign-on Web page and providing a user ID and password or perhaps other identifying information such as a smart card or biometric data, with which his identity can be authenticated. The identifying information is stored in a data structure that is referred to herein as a security token, and this stored information is leveraged for subsequently transparently authenticating the user such that he can seamlessly access a variety of Web-based applications and/or host applications within the scope of this same secure session (i.e., without having to provide other identifying information). The identification of the signed-on user is determined from the security token, and this user ID is sent to a host access agent such as RACF, which generates a passticket (or its equivalent). The passticket is programmatically inserted into a message that will be sent to the browser in embodiments 1-3, or to a Web proxy in embodiments 4-6. In embodiments 1-3, when the browser renders a Web page included in the message (or, alternatively, a Web page delivered separately from the passticket), an applet (or analogous downloaded software) is invoked and dynamically installs a TN3270 client that then begins executing on the workstation; in embodiments 4-6, the TN3270 client operates at the Web proxy, as will be described. In either case, the TN3270 client enables the workstation to communicate securely and seamlessly with the legacy host application.

First Preferred Embodiment

Figure 3:
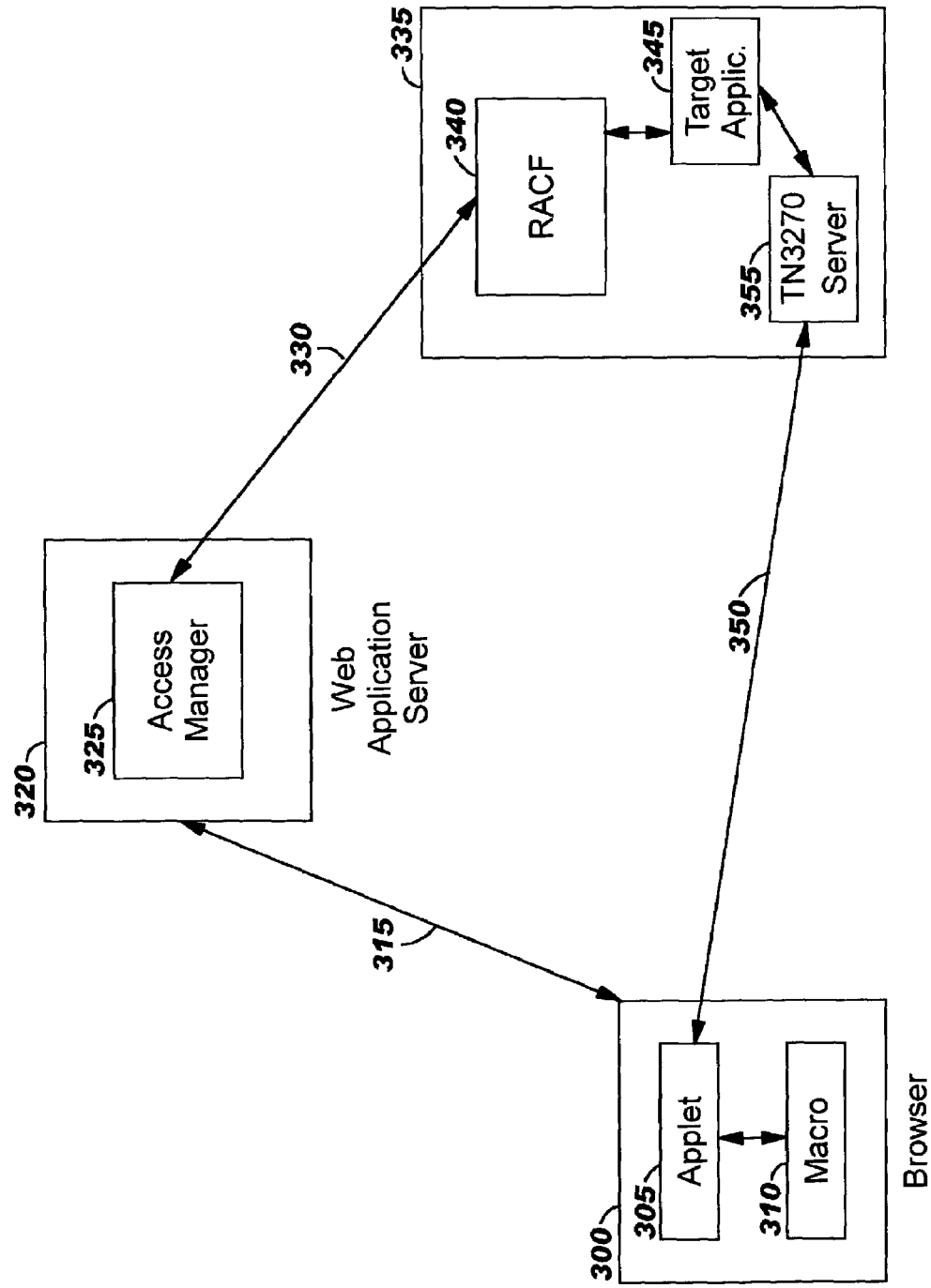
FIG. 3 illustrates components which enable a user to seamlessly access a protected legacy application using a Web-based security token, according to a first preferred embodiment of the present invention.

A first preferred embodiment, shown in FIG. 3, may be used when access manager agent software 325 operating on the Web application server 320 understands how to request passtickets from a legacy host access agent. A user working in a Web environment typically signs on to a Web site using an access manager agent by establishing a connection 315 from his browser 300 to a Web application server 320, and then using the browser to navigate to an initial sign-on Web page (such as a portal page 1100 shown in FIG. 11) where he provides his user ID and password. Using the provided user ID and password, the access manager agent can authenticate the user.

According to preferred embodiments, to enable the user to seamlessly access legacy applications, the initial sign-on Web page (or a subsequent page, alternatively) preferably provides an icon or hyperlink with which the user can select legacy application access. Suppose, for example, that the portal page 1100 of FIG. 11 is used as the initial sign-on Web page. A hyperlinked phrase, shown in the example as "Access Legacy Applications" at 1110, can be clicked on by the user to indicate that he wants to access legacy host applications. This hyperlink is referred to hereinafter as "the legacy access hyperlink". In the first preferred embodiment, when the legacy access hyperlink is selected, an HTTP message is sent to a Uniform Resource Locator ("URL") mapped to that hyperlink in the HTML syntax for the rendered page 1100. (References to use of hyperlinks are for purposes of illustration only. As will be obvious, other techniques may be used, such as by defining hotspots associated with icons, where a URL is then mapped to each hotspot.) According to the first preferred embodiment, code may be invoked at the selected URL that retrieves the user ID of the currently-signed-on user from the session token; alternatively, retrieval of the user's ID may be performed at another time, such as when the user selects a particular legacy application. This code then sends a Web page, such as legacy access page 400 of FIG. 4, to the client's browser for rendering.

Figure 4:
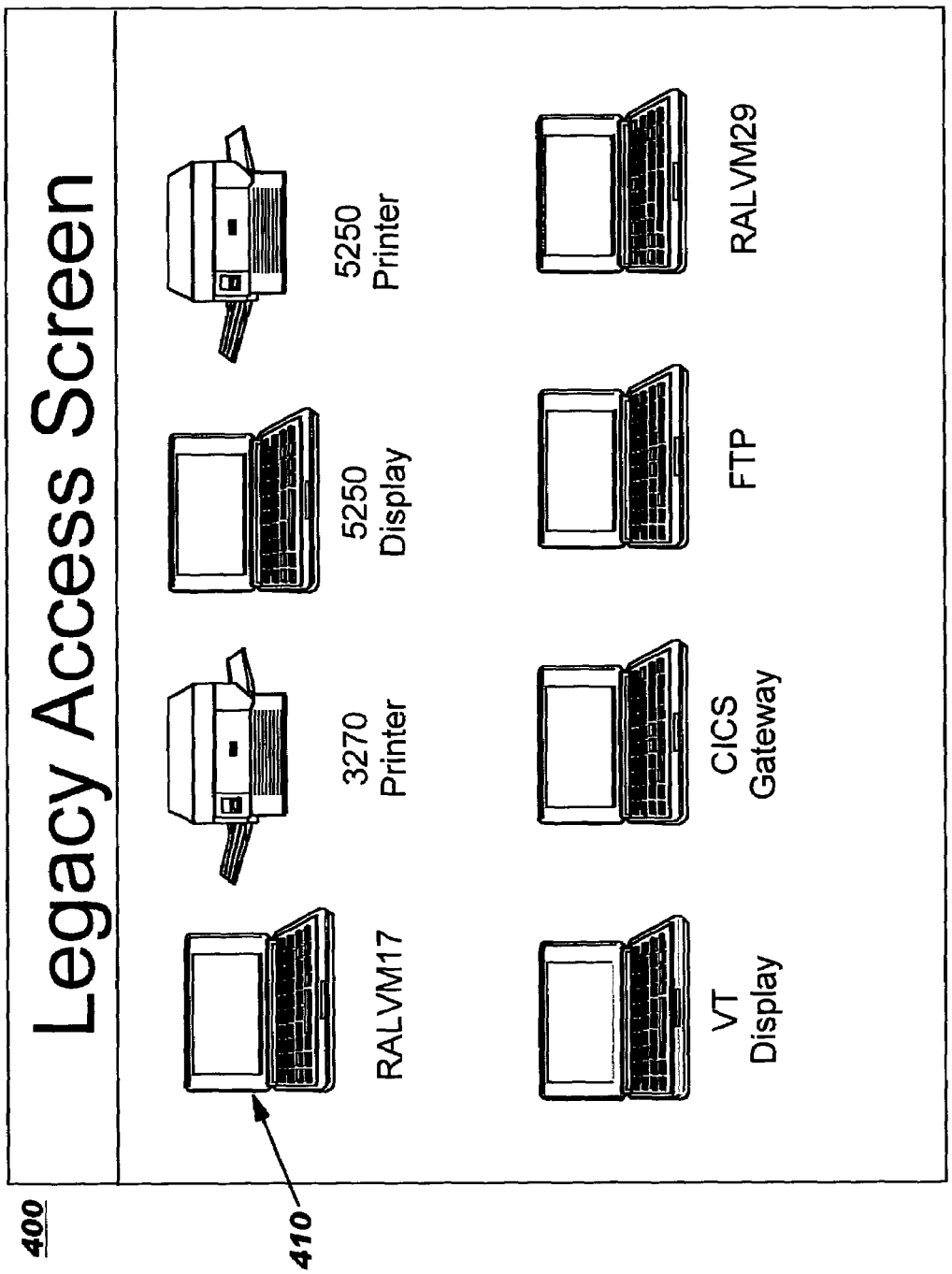

In this example, legacy access page 400 in FIG. 4 provides a representation of various legacy applications. Icons are provided on this sample page representing various types of legacy access displays, legacy printers, and so forth, and serve as hotspots or links to individual legacy applications. (As will be obvious, many different approaches may be used for enabling the user to initiate legacy host access from his browser, and thus FIG. 4 and its corresponding text are provided for purposes of illustration only). The icons shown on FIG. 4 are referred to herein as "legacy access icons", because selecting one of these icons initiates access to the corresponding legacy application, using techniques disclosed herein.

In an alternative approach, rather than using a separate legacy access page, the legacy access icons may be provided directly on the initial sign-on Web page 1100.

According to a first aspect of the first preferred embodiment, when the user selects a legacy access icon, an HTTPS (i.e., secure HTTP) request message is sent to an associated URL, causing code residing at that URL to be invoked. This code may be legacy-host-specific, or the TCP/IP address of the target host might be included in the request. This code—which is referred to herein as the "legacy access code"—retrieves the user ID of the currently-signed-on user from the security token (if it has not already been retrieved) and then commences the transparent sign-on process. This transparent sign-on process sends the user's host access credentials to the user's browser (along with HTML code), where they are automatically inserted into a sign-on data stream, as will be described. This legacy access code may be implemented within the access manager, but in preferred embodiments is implemented as separate logic which invokes Application Programming Interface ("API") commands of the access manager to carry out single sign-on functions.

According to a second aspect of the first preferred embodiment, the legacy access code is invoked immediately upon the user selecting to access legacy host applications. In this second aspect, the legacy access code determines the user's ID and maps that ID to host credentials before HTML code representing the selection of legacy access icons is delivered to the workstation. For example, once the user has provided his user ID and password on a Web page such as page 1100 of FIG. 11, selecting legacy access hyperlink 1100 triggers execution of the legacy access code. In this second aspect, the user's credentials are sent to the browser along with the HTML code of the Web page from which the legacy access icons can be selected (such as Web page 400 of FIG. 4). This second aspect also programmatically inserts the credentials into the sign-on data stream for the selected legacy application. In this second aspect, where credentials are retrieved before the user selects a particular legacy application, it may happen that the selection page to be presented to the user allows him to select from among several different legacy applications. If credentials are retrieved for each of these potential applications, the relatively short lifetime of the passticket may result in the passticket expiring before the user has selected which legacy application he wants to execute. Thus, this second aspect is preferably used in scenarios where the target application can be determined without waiting for the user's selection (e.g., where only one choice is presented) or where sessions with each potential legacy application are to be initiated without waiting for the user's input.

Returning again to FIG. 4, the legacy access page 400 shows a number of legacy access icons. In preferred embodiments, each icon represents a different set of configuration data, such as the target host address of the corresponding legacy application, a macro or script to be invoked when the icon is selected, and so forth. In one approach, a person such as a systems administrator defines a macro or script (hereinafter referred to as a macro) for each icon and associates that macro with the icon such that selecting the icon causes the macro to execute at the client workstation. (This macro may generate the HTTPS request message discussed above; or, the request may be generated outside the macro.) As used herein, "macro" refers to a sequence of commands, including host screen interactions and the necessary actions to navigate them, which has been captured and recorded to enable using them in an automated manner at a later time. The macro includes application-specific information about the data stream traffic to be sent to and received from a particular legacy host application. IBM's Host On Demand product, for example, may be used to create macros of this type.

Typically, an icon will be created and displayed on the user's desktop to enable the user to conveniently launch the legacy application by clicking on the icon, as illustrated in FIG. 4. Or, if desired, a macro can be configured as an auto-signon macro which will play automatically at the beginning of a user's emulator session. Use of a macro or equivalent functionality by the TN3270 client is assumed for purposes of the present invention, where the macro operates to transparently detect occurrence of host screens of interest for a particular application and to respond appropriately to those host screens. More specifically, macros used with the present invention detect occurrence of a legacy application sign-on screen, and programmatically supply a user ID and passticket value (or password value, in embodiments 3 and 6) at the locations within that sign-on screen where the legacy application expects to find the user's manually-entered user ID and password. In this first preferred embodiment, the programmatically-supplied user ID and passticket values comprise the user credentials which are included with the HTML code that is transmitted to the workstation from the access manager agent. (The manner in which the user ID and passticket/password values are provided in other embodiments is described below.)

Figure 5:
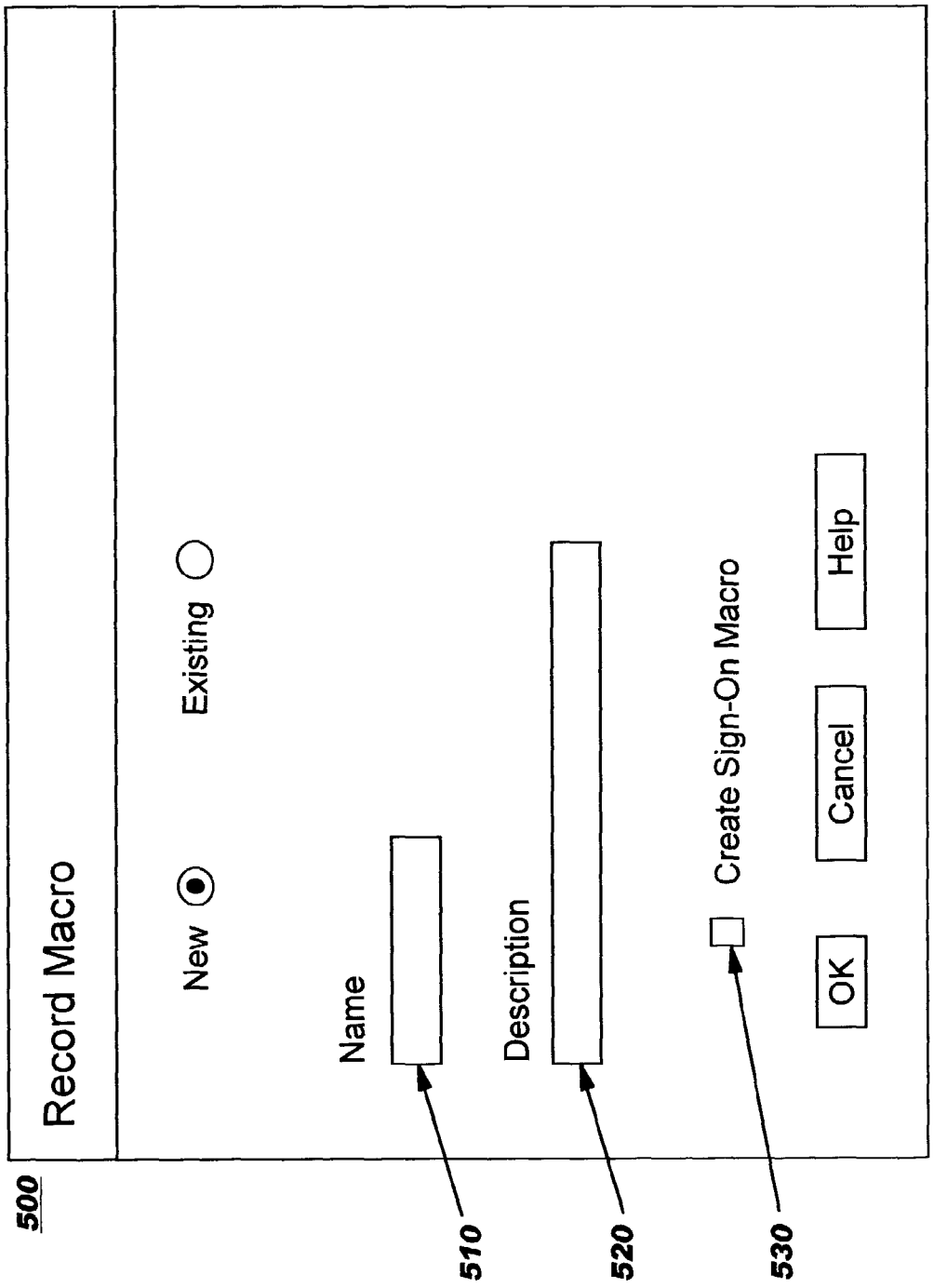

FIGS. 5-9 show how a sign-on macro for use with embodiments of the present invention might be created using Host On Demand. As shown in FIG. 5, a "record macro" window 500 is displayed, with which the macro creator will specify a name 510 for the macro and an optional description 520. Suppose that the provided macro name is "My New Macro". A checkbox 530 is also shown in window 500, whereby the macro creator can indicate whether this macro is to be used for signing on to legacy applications. When this box is checked, a subsequent series of windows prompts the macro creator for pertinent sign-on information, and the underlying macro generation code records the provided information accordingly.

When a sign-on macro is being created, the macro creator will be asked to identify the location of the user ID and password during the sign-on sequence (e.g. on which panel(s) this information will be requested, and in what relative position within the data stream the response is to be returned), along with the identifier of the application. The macro configuration software will then store the application identifier ("application ID") in the macro, along with the information on where the user ID and password fields appear in the data stream sent from that application.

Figure 6:
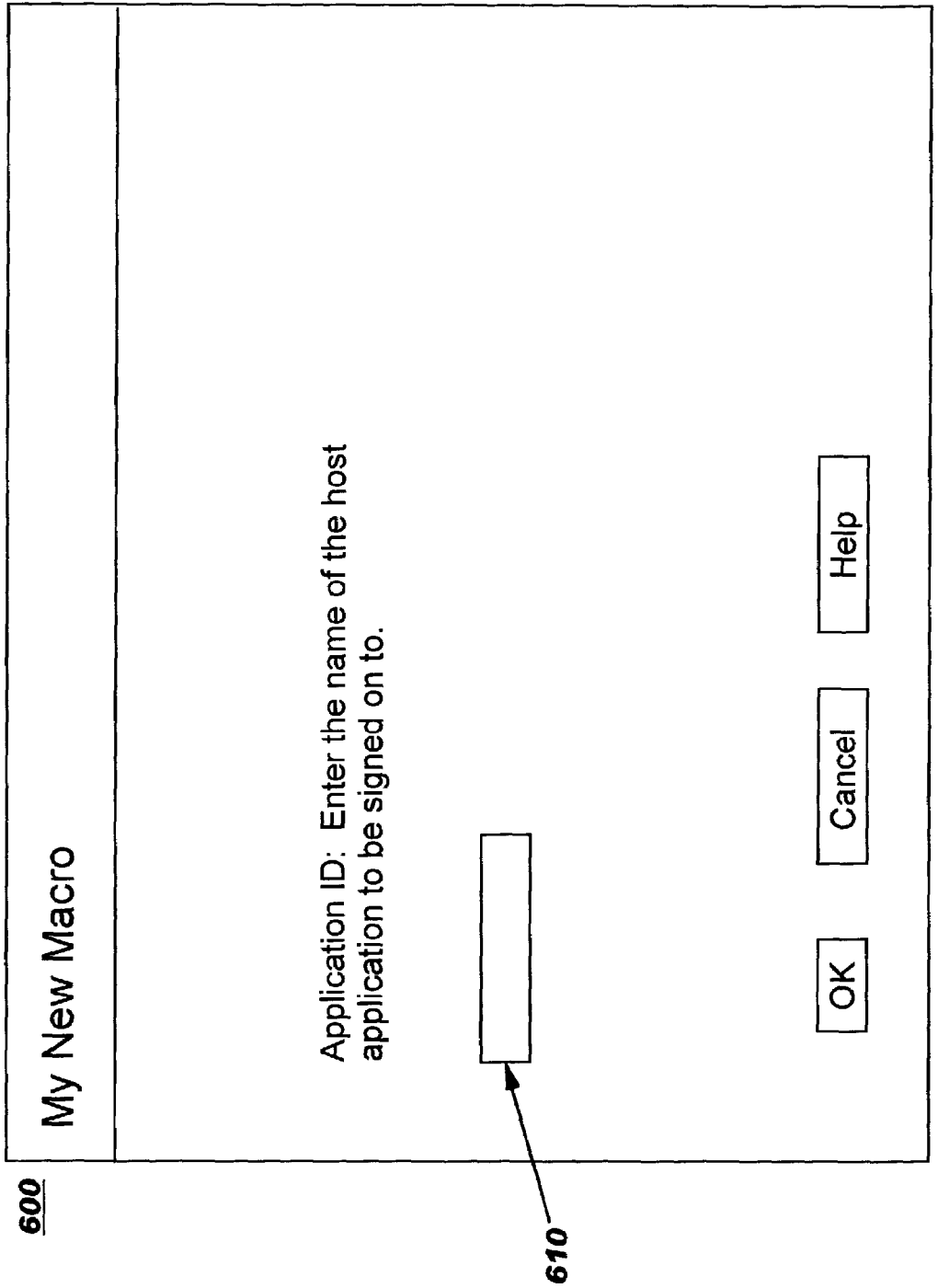
Figure 9:
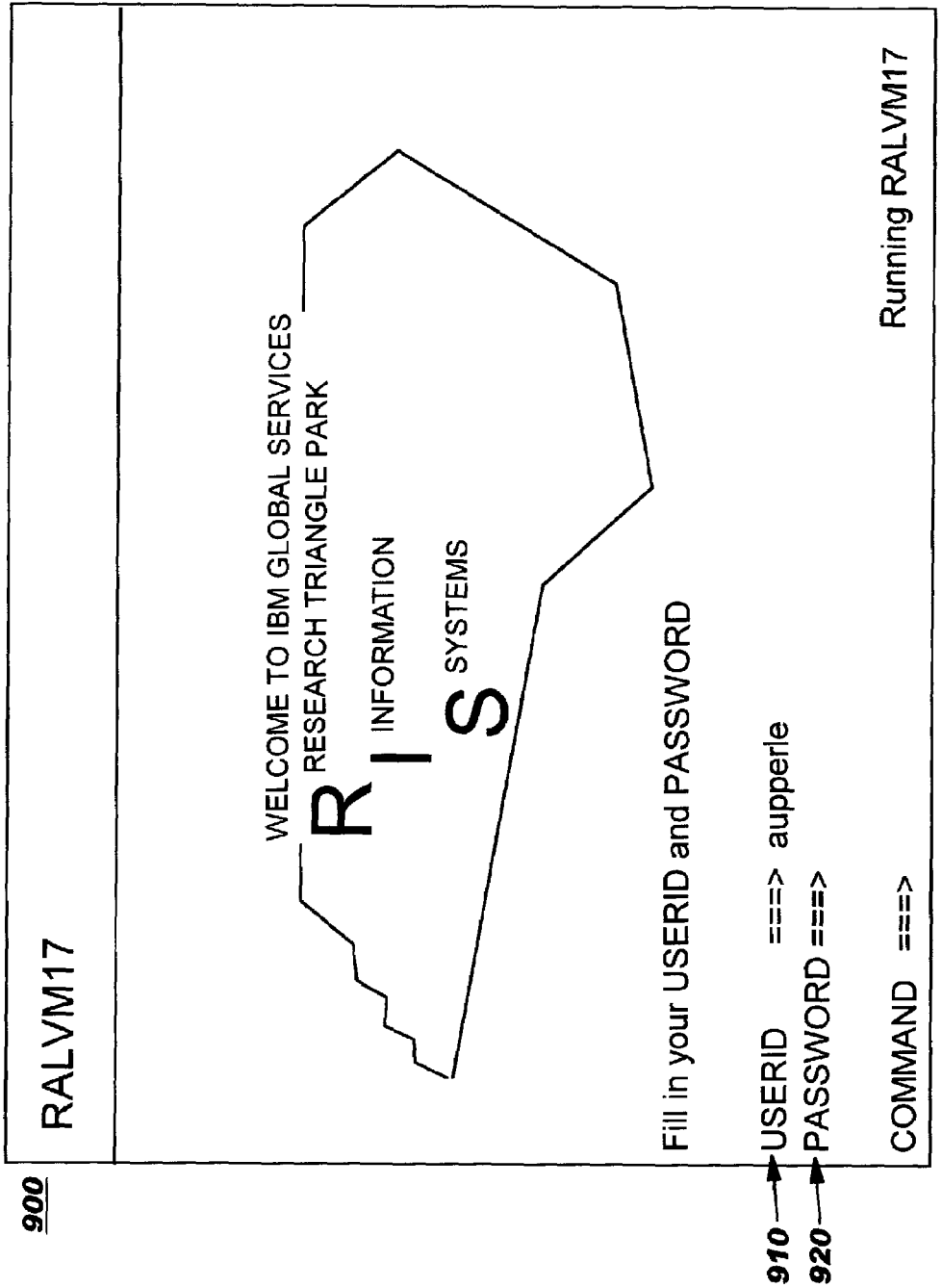

FIG. 6 shows a first sample window 600, where the macro creator identifies the host application by entering its application ID into entry field 610. As an example, suppose that the desired application is named "RALVM17". FIG. 9 shows a sample sign-on screen 900 for this application. Thus, for the example, the macro creator records the value "RALVM17" by entering those characters into field 610 and then pressing the "OK" button.

Figure 7:
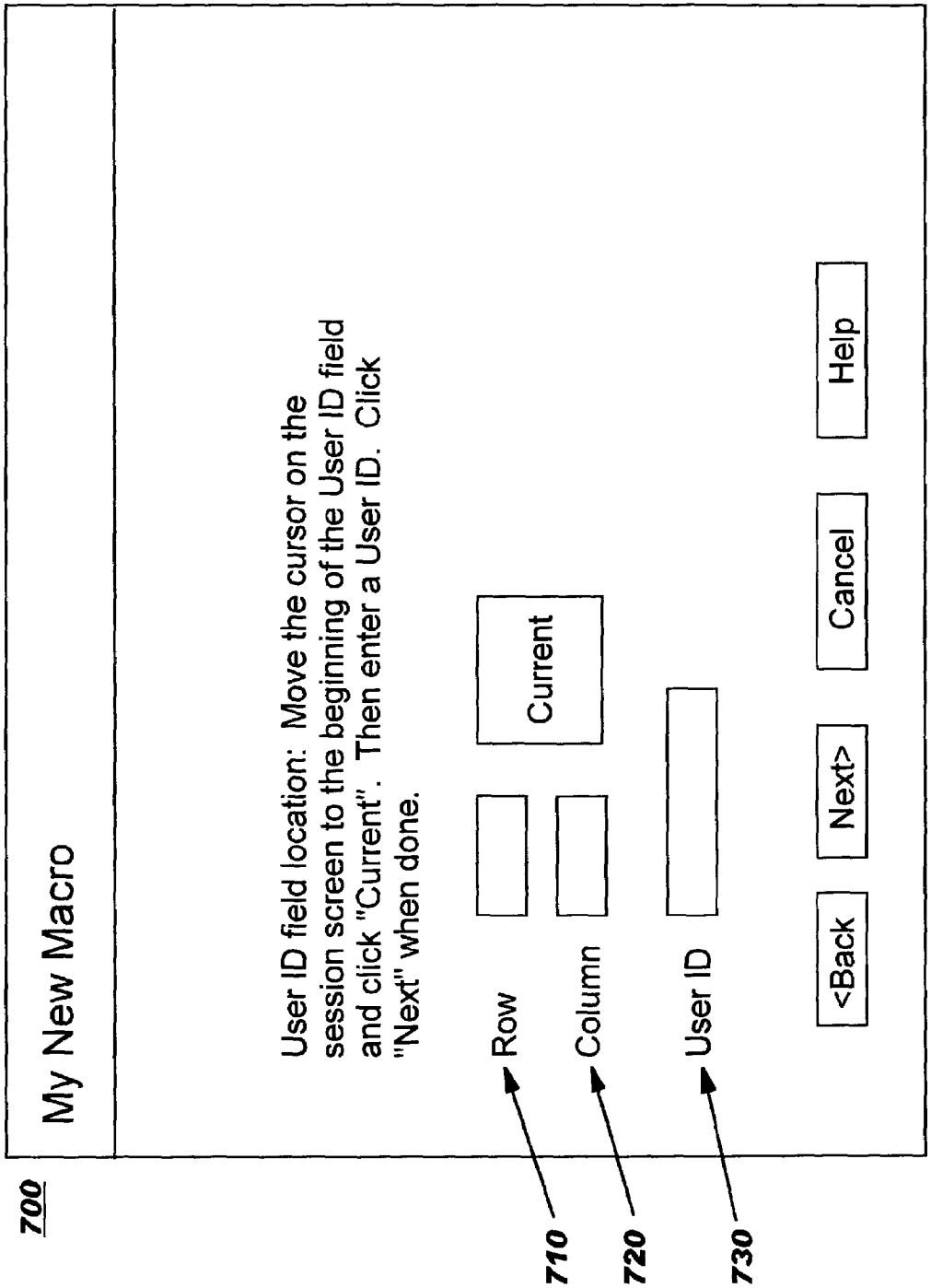

Sample window 700, shown in FIG. 7, appears next, and is used to record the location of the user ID. This sample window 700 instructs the macro creator to position the cursor to the beginning of the user ID field in a currently-displayed sign-on screen, after which the macro creator is to press the "Current" button. The Host On Demand software then automatically inserts the row and column numbers corresponding to the cursor location into fields 710 and 720, respectively. (Alternatively, the macro creator might simply type the row and column numbers of this information, if those values are readily available.) Next, when using Host On Demand, the macro creator provides a user ID in field 730 that enables him to successfully sign on to the host application while recording the macro. For example, referring to the sample legacy host sign-on screen 900 shown in FIG. 9, suppose that the macro creator has placed the cursor into the data entry area associated with the "USERID=>" prompt at 910, and that the beginning of this data entry area is determined to be at row 39, column 16. The data entries fields at 710 and 720 will be filled in with these values. The macro creator then specifies a user ID (shown in the example as "aupperle") by entering that ID into field 730, and presses the "Next" button to continue to the next macro definition window. During operation of this first embodiment of the present invention (as well as in embodiments 2 and 3), the user ID from the host access credentials sent to the workstation with the HTML code (and notably, not the user ID entered by the macro creator) will be filled in automatically when the macro executes, starting from the defined row and column within the presentation space representing the sign-on screen 900.

Figure 8:
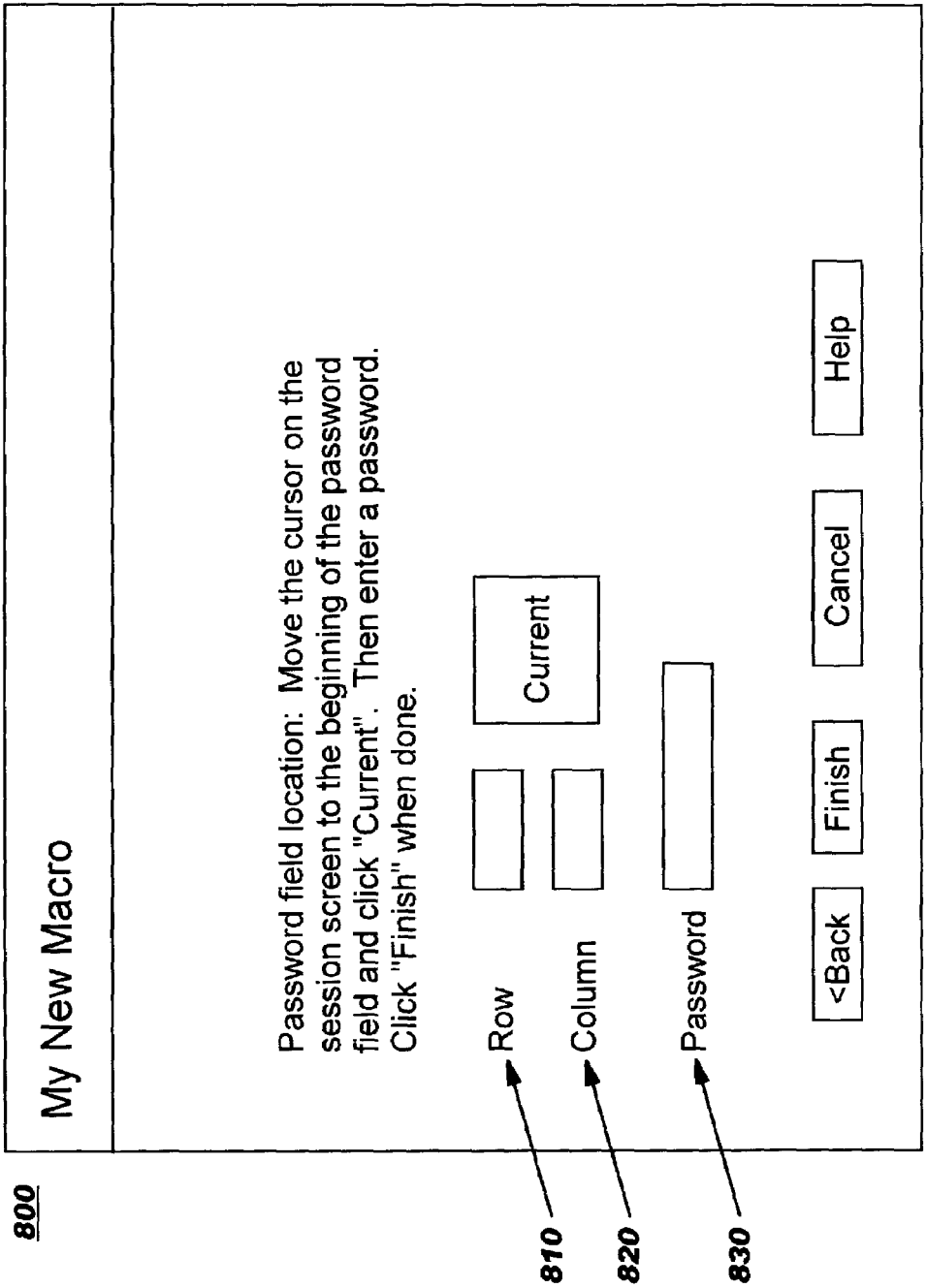

Once the user ID information requested in window 700 is complete, a window 800, shown in FIG. 8, is displayed to allow the macro creator to record the location of the password in the sign-on screen. Here, the macro creator is instructed to place the cursor at the beginning of the password field in the currently-displayed sign-on screen, after which the macro creator is to press the "Current" graphic. The row and column numbers corresponding to the cursor location will then be automatically inserted into fields 810 and 820, respectively. Next, when using Host On Demand, the macro creator provides a user password into field 830. Referring again to the sample screen 900 FIG. 9, the data entry area associated with the "PASSWORD=>" prompt at 920 appears to begin at row 40, column 16. The data entries fields at 810 and 820 will be filled in with these values, and the macro creator then specifies a password by entering that value into field 830. (Note that this password value belongs to the macro creator. When a person such as a systems administrator is creating macros for use by multiple users, neither the user ID or password of the macro creator are recorded as part of the macro.) The macro creator then presses the "Finish" button, and the macro is stored. In the first preferred embodiment, the password value will be filled in automatically from the passticket value delivered to the workstation, starting at the defined row and column of the presentation space, as the macro is executed. (Similarly, the password value will be filled in from the passticket or password value delivered to the workstation in embodiments 2 and 3, respectively.)

Figure 10:
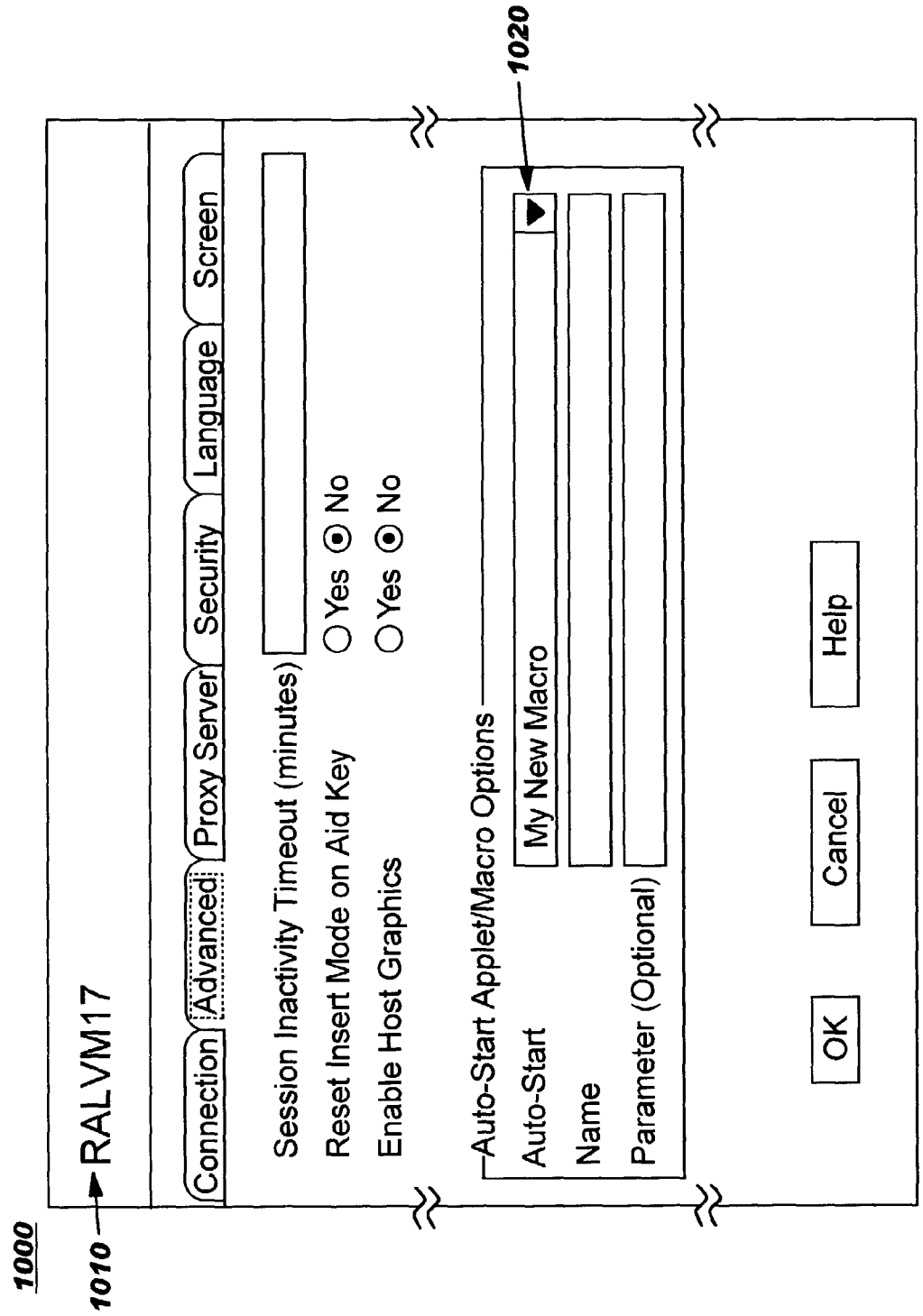
Figure 13:
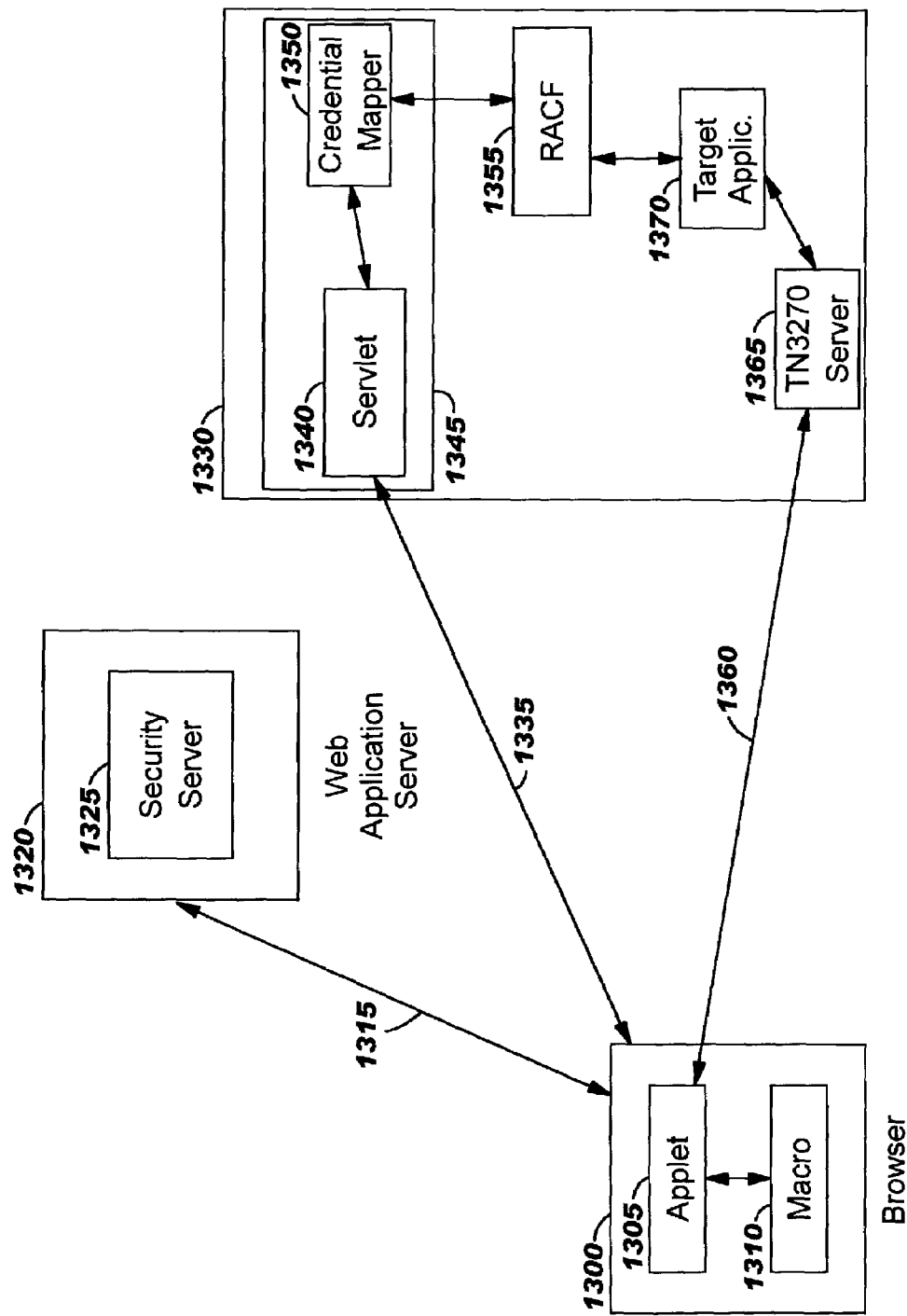
FIGS. 13-17 illustrate components which enable a user to seamlessly access a protected legacy application using a Web-based security token, according to second through sixth preferred embodiments of the present invention.
Figure 14:
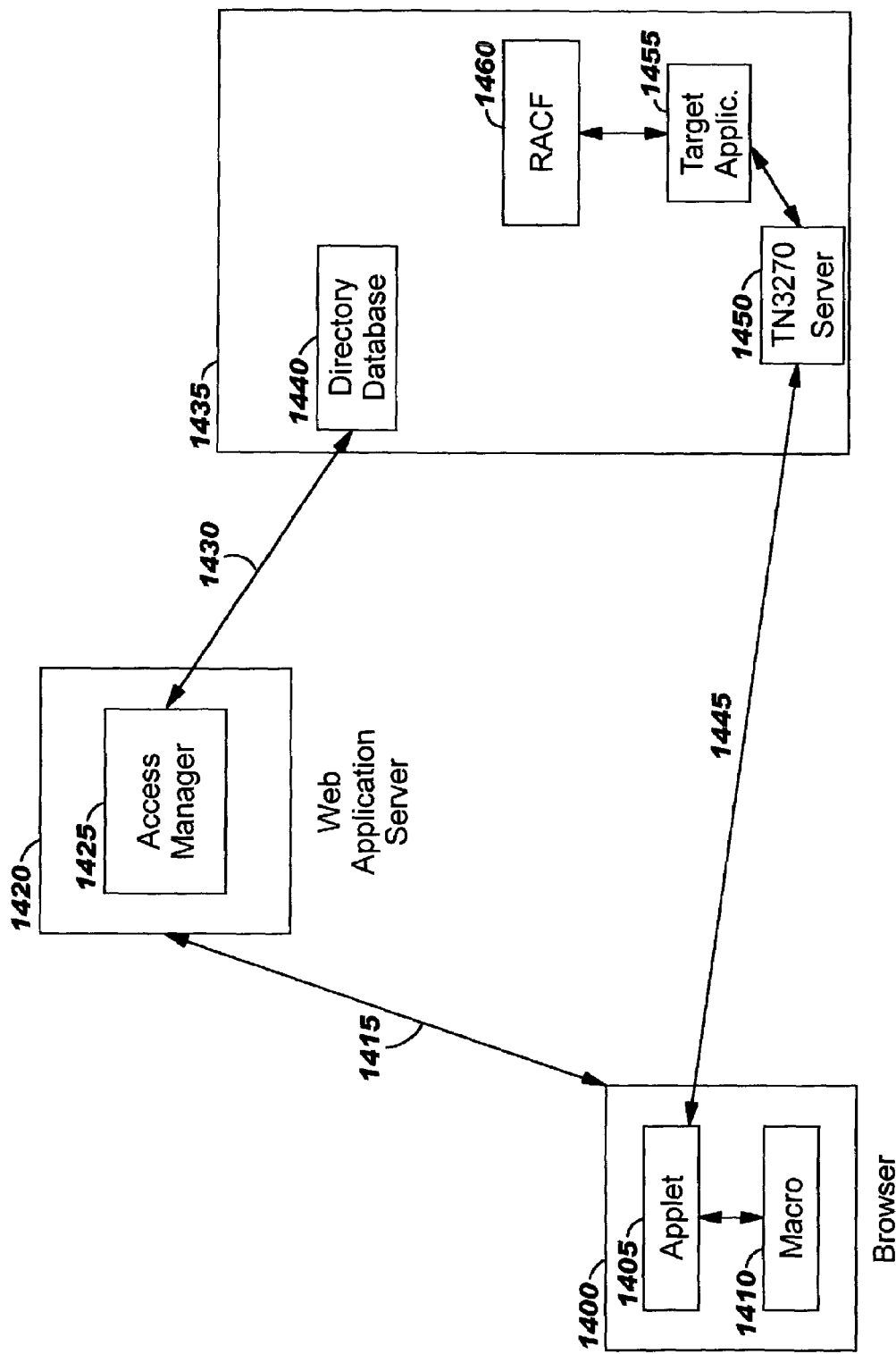

FIG. 10 shows one way in which the macro thus created may be associated with one of the legacy access icons from FIG. 4. In this example, a properties panel 1000 is defined that corresponds to the icon named "RALVM17" (see the identifier at reference number 1010). This icon appears at reference number 410 of FIG. 4. A field 1020 is provided for identifying the macro to be executed when icon 410 is selected. As shown in this example, the value "My New Macro" has been provided.

Once a macro of this type has been created, it is made available for downloading to the client workstation. Preferably, an applet containing the macros for each icon on legacy access page 400 is downloaded to the client workstation along with the HTML markup for the page from which the user can select an icon. In an alternative approach, the macro is not downloaded until the user selects a particular legacy access icon (signifying that he wishes to execute the corresponding legacy application).

Returning to the discussion of how the legacy access code initiates the transparent sign-on in the first preferred embodiment, this code cooperates with the access manager to obtain a passticket for the currently-signed-on user. As stated earlier, in this embodiment, access manager 325 knows how to request a passticket from a host access agent. Accordingly, the legacy access code preferably invokes an API command to request the access manager to (1) retrieve the user ID from the security token, and (2) send this value, along with the application ID from the macro, to RACF 340 over connection 330 (which is preferably a secure, trusted connection). (Alternatively, separate API commands may be invoked, first requesting retrieval of the user ID and then requesting that the values be sent to RACF for passticket generation.) Using this user ID and application ID, RACF can generate a passticket. This passticket is returned to the access manager, which returns it to the requesting legacy access code. (As discussed with reference to the second aspect of this embodiment, there may be scenarios where it is desirable to obtain a passticket before the user has selected to execute a particular legacy application, such as when there is only one available legacy application and where sessions with each potential legacy application are to be initiated without waiting for the user's input. In these scenarios, the application ID sent to RACF is the ID of the single available application, or a passticket may be requested using the ID of each potential application and each of these passtickets may be returned to the access manager.)

It may be necessary when using embodiments of the present invention to define a mapping between the user's ID for the Web environment and the user's ID for the legacy host environment, such that RACF can use the user's legacy user ID (instead of the user's Web ID) to authenticate the user and locate his access privileges. In this case, the mapping information is preferably created by a systems administrator, such that the Web ID (optionally, in combination with an application ID) can be used as a lookup key to find the legacy user ID. For example, user IDs in the legacy environment are typically limited to 8 characters, whereas a user ID in the Web environment might be relatively lengthy in comparison (such as the user's complete e-mail address). Thus, the mapping locates the legacy user ID corresponding to the user ID from the security token. This mapping may be performed on the target host, or on the Web application server, before sending the passticket request to RACF.

Upon receiving the passticket from RACF, the legacy access code (which is executing on the server side of the network) then writes the user ID and passticket into a message that is to be returned to the client browser 300. In the first aspect of this embodiment, the message is preferably returned as the HTTP response to the user's selection of the legacy access icon; in the second aspect, the message is preferably returned along with the Web page from which a legacy access icon will be selected. Suppose, for example, that the user in the first aspect selected icon 410, requesting access to an application named "RALVM17". The message to be returned as the HTTP response is generated, according to the first preferred embodiment, to contain the user credentials obtained from RACF by the access manager agent. The legacy access code may insert the user ID and passticket, into the response message in several different ways. In one approach, the values are written as meta-data into HTTP response headers. In alternative approaches, the meta-data may comprise one or more cookies of the response header (rather than separate headers) or parameter syntax encoded with the HTML markup for the page being transmitted. In this latter case, options for the syntax include: (1) a "META" tag using an "HTTP-EQUIV" attribute syntax; (2) a "META" tag using a "NAME" attribute syntax; (3) a specially-denoted comment; and (4) applet parameters. These aspects are illustrated in FIGS. 12A-12E.

As a further approach, the user credentials may be returned to the workstation using a SOAP ("Simple Object Access Protocol") message. This approach is preferably used in a Web services environment, and is illustrated in FIG. 12G; FIG. 12F shows how the credentials may be obtained using a SOAP message in a Web services environment.

In FIG. 12A, HTTP response header syntax is illustrated that enables the user ID and passticket to be transmitted using HTTP 1.1 headers. Assuming that an HTTP GET request such as "GET http://www.ibm.com/LegacyAccess-RALVM17 HTTP/1.1" was received at the legacy access code, the response header shown in FIG. 12A indicates the following information: (1) the status is "OK" (see element 1200); (2) this is a response message (see element 1205); (3) the user ID for the currently-signed-on user is "xyzzy" (see element 1210); and (4) the passticket for this user is "a1s2d3f4" (see element 1215). The "UserID" and "Ticket" headers shown at 1210 and 1215 are examples of the header syntax that the legacy access code generates, and that the sign-on macro executing on a client will search for, according to the present invention. Alternatively, other names for these headers might be used, or a single header might be used to convey both the user ID and passticket values (for example, with some known delimiter separating the user ID from the passticket value).

Markups in a markup language such as HTML may be used as an alternative to the format shown in FIG. 12A. One example of an alternative format uses the "HTTP-EQUIV" attribute on a "META" tag, as shown at 1220 and 1225 in FIG. 12B. In this example, the syntax "UserID" has been used as the name of the first META element 1220, and has a value of "xyzzy", corresponding to element 1210 of FIG. 12A; the second META element 1225 is named "Ticket" and has a value of "a1s2d3f4", corresponding to element 1215 of FIG. 12A. A META element may be used to identify properties of a document. An HTTP-EQUIV attribute on a META tag may be used in markup language documents to explicitly specify equivalent information that an HTTP server should convey in the HTTP response message with which the document is transmitted. Information on this tag can be found in Request For Comments ("RFC") 2518 from the Internet Engineering Task Force, which is entitled "HTTP Extensions for Distributed Authoring—WEBDAV" (February 1999), as well as on the Internet at location http://wdvl.com/Authoring/HTML/Head/Meta/HTTP.html.

Another example of an alternative format for use with HTML documents uses the META tag with a "NAME" attribute, rather than an HTTP-EQUIV attribute. This alternative is illustrated in FIG. 12C at elements 1230 and 1235. The NAME attribute on a META element identifies a property name, and the VALUE attribute then specifies a value for that named property. For more information on use of the NAME attribute, refer to RFC 2518 or to http://wdvl.com/Authoring/HTML/Head/Meta on the Internet.

A third example of an alternative format for use with HTML documents uses specially-denoted comments within the body of a content response, as illustrated at 1240 and 1245 in FIG. 12D.

As yet another example of an alternative format, when using HTML, applet parameters may be encoded by the legacy access code, where an emulator applet executing on the client (as described below with reference to element 305 of FIG. 3) locates these parameter values and passes them to an internal processing component. An example of applet parameter syntax is shown at 1250 and 1255 in FIG. 12E.

FIGS. 12F and 12G show a sample SOAP message exchange. In FIG. 12F, an element 1265, which for purposes of illustration is named "getcred" (i.e., "get credentials"), is embedded within the body of SOAP envelope 1260. In this sample request message, three arguments are passed by the legacy access code to a credential service or host access service to request a passticket. The first argument identifies the target host, and in the example has the value "myserver.ibm.com". The second argument identifies the target legacy application, and in the example has the value "ralvm17". The third argument contains the user's identifying information, as extracted from the security token. In the example, this argument has the value "xyzzy". FIG. 12G illustrates a sample response message, with which the legacy access code can deliver the obtained credentials to the client. In this example, an element 1275, which for purposes of illustration is named "getCredResponse" (i.e., "get credentials response"), is embedded within the body of SOAP envelope 1270. Embedded within this element is a "getCredResult" element 1280, representing the user's ID and the passticket value; in the example, this element 1280 has the value "xyzzy a1s2d3f4". (The manner in which SOAP messages are exchanged in a Web services environment is well known to those of skill in the art, and a detailed discussion thereof is not deemed necessary to an understanding of the inventive concepts of the present invention.)

With reference to the various formats shown in FIGS. 12A-12E and 12G, what is required is that the legacy access code that generates the user ID and passticket syntax, and the macro/code on the client that will be searching for the values contained therein, are synchronized regarding which format will be used in a particular implementation.

Returning again to the discussion of the legacy access page to be returned to the client browser from the legacy access code, this page is defined such that, when it is rendered at the client it will automatically start a legacy access applet. This legacy access applet is represented in FIG. 3 at element 305, and in preferred embodiments is written such that it includes a TN3270 client or analogous emulator.

The manner in which this first preferred embodiment provides the transparent sign-on will now be described in more detail with reference to the components shown in FIG. 3. The TN3270 client (shown in FIG. 3 as applet 305), which executes on the client workstation, starts a TN3270 session with a TN3270 server 355 (which will be used for communicating with the target legacy application 345), as shown at element 350. The legacy application sends its initial application data on that TN3270 session, where this initial application data typically comprises an application-specific sign-on screen. (For example, if the RALVM17 legacy application is selected by the user, then a sign-on screen for the RALVM17 application, such as the example page 900 of FIG. 9, is returned in the TN3270 data stream.) Note that, according to the present invention, this sign-on screen does not need to be displayed to the user. This is because the macro 310 (in cooperation with the applet 305) will intercept the sign-on screen when it is delivered from the legacy application, programmatically extract the user ID and passticket from the HTTP response header received from the server side (when using the approach illustrated in FIG. 12A, or from one of the alternative syntax formats when using an approach such as those illustrated in FIGS. 12B-12E and 12G), and insert the extracted user ID and passticket values into the identified locations of the data stream. The macro then returns the modified data stream to the legacy application 345 over TN3270 session 350. The legacy application can then retrieve the user ID and passticket from the data stream in its conventional manner, and passes those values to RACF for validation. Assuming that the validation succeeds (as should be the case), the user is now transparently signed on to the legacy host application and can interact with that application in the same manner as a user who manually provides his user ID and password.

As an alternative to detecting the sign-on screen with a macro 310, and inserting credential values into particular places in the data stream by this macro, the applet 305 may be adapted for this purpose. As yet another alternative, rather than using a macro, component 310 may be provided as an applet. To distinguish it from applet 305 (which is preferably usable with multiple target applications), this applet is referred to as a "start-up applet".

Note that the start-up applet or macro 310 is specific to the enterprise in which the present invention is deployed. That is, the applet or macro must be defined such that it locates the sign-on screen for the application of interest, and inserts the user ID and passticket into the data stream for that application.

At some point, the user may wish to access a different legacy host application (or a Web-based application). When the user selects an icon representing a different legacy host application, an HTTP request message may be sent to the URL associated with that icon, and server-side legacy access code then executes in the same manner that has been described. That is, the legacy access code will retrieve the user ID from the security token (preferably, by requesting that information from the access manager agent), and once user credentials relative to the newly-requested application have been obtained from RACF, the legacy access code inserts the user ID and passticket into an HTTP response message to be downloaded to the client. The macro corresponding to the newly-selected icon may use the existing TN3270 session 350, and convey a change of application ID to the TN3270 server 355 (for example, by sending an "IAC SB NEW-ENVIRON INFO" Telnet message with a "USERVAR APPLID" parameter containing the new application ID). Or, the macro for the selected icon may cause the running emulator applet 305 to start a new TN3270 session using the configuration data from the macro, in which case the new session will be established in the manner described above with reference to session 350.

Depending on the user's selection, execution of a different applet may be triggered, which in turn may invoke a different emulator client (e.g., a TN5250 client) on the workstation (if this client was not already invoked). (If the emulator client has not been downloaded to the client workstation, then this dynamic deployment preferably occurs as described with reference to applet 305.)

In any case, when the newly-selected legacy host application is invoked, it will send its sign-on screen on a Telnet session to the emulator client on the workstation. The macro corresponding to this legacy host application will intercept the sign-on screen and insert the new credentials for returning to the legacy host application, in the same manner as has been described.

Second Preferred Embodiment

In a second preferred embodiment, the access manager agent is not adapted for requesting passtickets from a host access agent. Accordingly, server-side code such as a servlet and a credential mapper function are used to handle the passticket request. This embodiment will be described with reference to the components illustrated in FIG. 13. (It should be noted that many features described with reference to the first preferred embodiment apply equally to this embodiment, such as establishing a secure session with a Web application server, receiving a Web page from which a legacy application can be selected, use of macros, and so forth. Accordingly, this description of the second preferred embodiment will not repeat the details of that information. Furthermore, the third through sixth embodiments share many of these same features, and discussions thereof will therefore focus on differences. For ease of reference, subsequent discussions do not distinguish between legacy access code functions and an access manager or similar component, although it will be evident to one of skill in the art that this delineation of function may be maintained.)

This second preferred embodiment includes a security server component 1325 executing on a Web application server 1320. The browser 1300 initiates a secure session 1315 with the Web application server, providing the user's ID and password, with which the security server component authenticates the user. The security server then retains the user's identifying information in the Web security token. In addition, in this embodiment, the security server sends the security token to the browser. Preferably, one of the approaches illustrated by FIGS. 12A-12E and 12G is used for this purpose (where the security token is conveyed instead of the user ID and passticket).

When the user selects to access legacy applications, or alternatively to access a particular application, an HTTP request is transmitted from browser 1300 over a connection 1335 to a servlet 1340 executing in a Web application server 1345, where this request includes the security taken and the application ID of the selected application (or a plurality of application IDs, if one has not yet been selected, as discussed with reference to the second aspect of the first preferred embodiment).

For purposes of illustration, it is assumed that components 1340-1370 operate at the target host 1330; alternatively, one or more of these components may be located elsewhere, in which case a secure, trusted connection is provided between host 1330 and the additional machine(s).

When invoked, servlet 1340 obtains the security token from the HTTP request, and extracts (or otherwise determines) the user ID of the currently-signed-on user from this token. The servlet then contacts a credential mapper component 1350, which may also be running on the Web application server 1345, requesting a passticket. The application ID and user ID are preferably transmitted on this request, and the credential mapper then forwards these values to RACF 1355 with a request to generate a passticket; or, the credential mapper may first locate the legacy host ID that corresponds to the user ID which has been retrieved from the security token, and forward that legacy host ID to RACF along with the application ID, as discussed earlier. In either case, the generated passticket is returned to the credential mapper, which in turn forwards it to the servlet.

The servlet, in turn, writes the user ID and passticket into a response it prepares for sending to browser 1300 over connection 1335. This response may be created as described above with reference to FIGS. 12A-12G. This response message preferably includes an applet 1305 and host access macro (or macros) 1310 for delivery to the client workstation. (If those components have already been delivered, servlet 1345 may be adapted for sending only the user ID and passticket.)

When the applet is downloaded and begins execution, it reads the user ID and passticket values which have also been downloaded, and passes those values to a macro (or, alternatively, to a start-up applet) in the manner which was described with reference to the first preferred embodiment. Applet 1305, which preferably operates as a TN3270 client, initiates a TN3270 session 1360 to a TN3270 server 1365 at the target host, requesting access to target legacy application 1370. TN3270 server 1365 sends a request to the legacy application 1370, which will typically respond with a 3270 data stream containing a sign-on screen (such as screen 900 of FIG. 9). The TN3270 server transforms the 3270 data stream into a TN3270 data stream, and sends that data stream to the emulator client 1305. Upon receiving this data stream, the macro 1310 or similar software executing at the client workstation automatically inserts the user ID and passticket into the data stream, and returns the modified data stream to the TN3270 server which forwards it to the legacy application.

When the legacy application receives the data stream containing the sign-on screen and filed-in values, it extracts the user ID and passticket and passes those values to RACF for authentication. This extraction and authentication of information from the sign-on screen occurs in the same manner as if the user had manually provided his user ID and password in the prior art, thus allowing the legacy application and RACF software to function without change. Because the user ID and passticket values were supplied programmatically, however, this secure sign-on to the legacy application is transparent to the user. At some point, the user may change to a different application, either a Web-based application or a legacy host application. The subsequent authentication for that application also occurs in a seamless manner, using the security token, using the techniques which have been described.

Third Preferred Embodiment

In a third preferred embodiment, useful where passticket capability is not available, the user's credentials are retrieved from a "lockbox" (i.e., secure storage) accessible by the Web application server with which the client has established a secure session. This embodiment will be described with reference to the components in FIG. 14.

As in the first and second embodiments, browser 1400 establishes a secure session 1415 to Web application server 1420, and access manager 1425 authenticates the user with his user ID and password (or similar identifying information). When the user requests to access a legacy application, the browser sends an HTTP request, which reaches the access manager. In response, the access manager retrieves the user's ID from the security token, and sends this user ID and the ID of the selected application (or of each potential application, as described with reference to the second aspect of the first preferred embodiment) over a secure, trusted connection 1430 to a directory database component 1440. The directory database component then retrieves the user's password (or password substitute) from the lockbox, and returns it to the access manager. (For purposes of illustration only, the directory database component is shown as being located on the same target host 1435 as the target legacy application 1455.)

The access manager then generates a response to the HTTP request, into which it inserts the user's ID and password (preferably using one of the techniques described with reference to FIGS. 12A-12E and 12G), and sends this response to browser 1400. As in the other embodiments, this response message preferably transmits an applet 1405 and one or more macros 1410 that will be installed onto the client workstation.

When the applet 1405 begins executing, it preferably operates as a TN3270 client and establishes a TN3270 session 1445 with a TN3270 server 1450 operating on a target host 1435. An identifier of the target application 1455 is transmitted over this session, causing the target application to return its sign-on screen or similar start-up information. When this data stream is received at applet 1405, macro 1410 locates the position where the user ID and password values are expected, and inserts the values sent to the browser by the access manager. The TN3270 client returns this data stream over session 1445, and upon receiving it, the target application 1455 sends the user ID and password to RACF 1460 for authentication. Assuming that the user is successfully authenticated, he can then interact with the legacy application, without having to manually provide his user ID and password.

Fourth Preferred Embodiment

Figure 15:
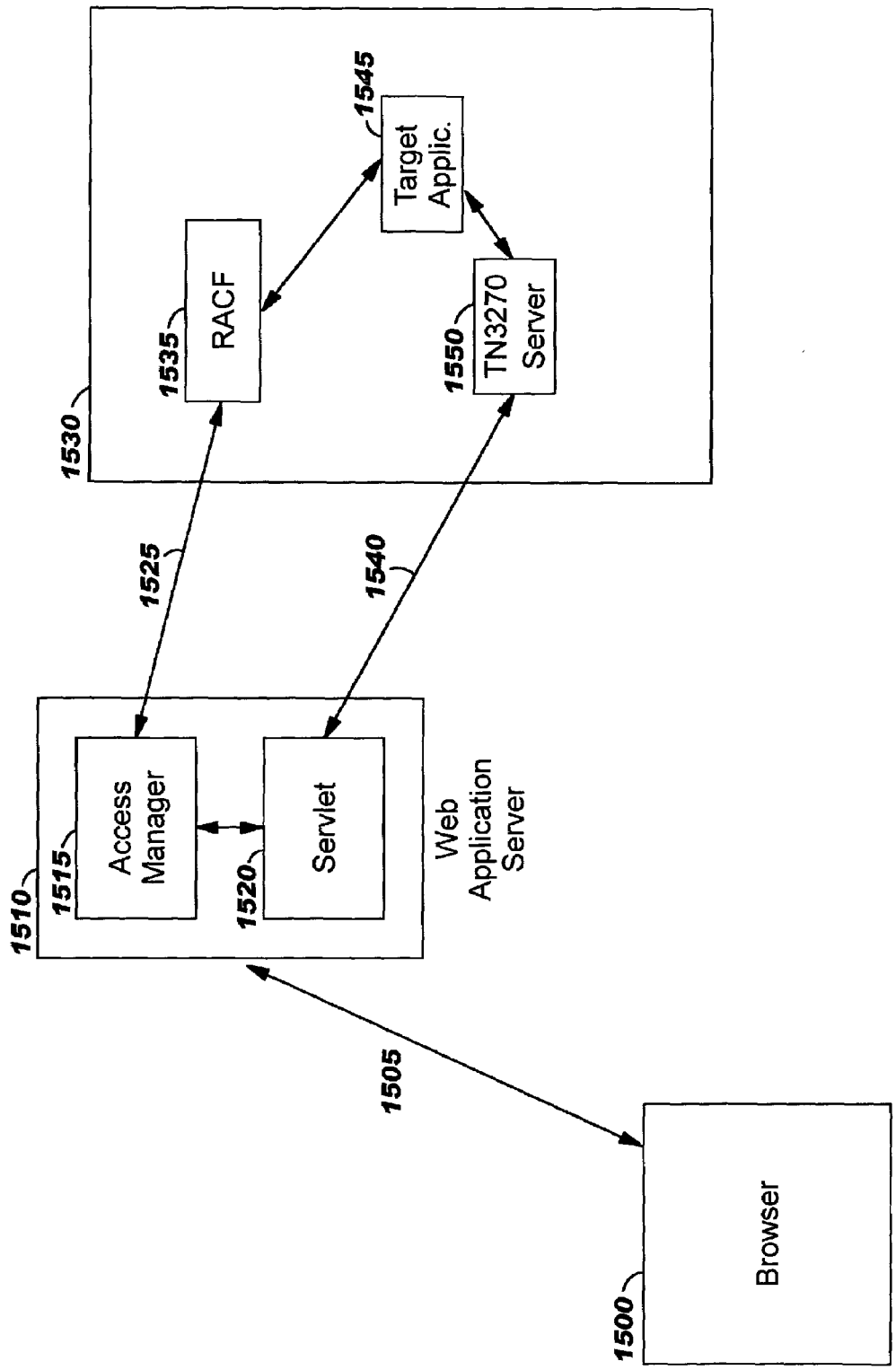

A fourth preferred embodiment is illustrated in FIG. 15. In this embodiment, the emulator client resides on a Web application server rather than on the client workstation, and thus the 3270/TN3270 data stream does not reach the workstation. The Web application server therefore functions as a proxy for the Web client, intercepting and responding to messages on behalf of the client, which uses a browser (or other similar software). In this fourth preferred embodiment, an access manager 1515 is adapted for requesting passtickets from a host access agent such as RACF 1535, and thus this fourth embodiment is similar in some respects to the first preferred embodiment.

Referring now to FIG. 15, the client's browser 1500 initiates a secure session 1505 to the Web application server 1510, providing the user's user ID and password (or other identifying information). The Web application server authenticates the user using this information, and stores the security token for later use. When the user indicates his desire to interact with the host system 1530, a servlet 1520 (or similar application executing on the server side) is invoked, and requests access manager 1515 to obtain host credentials for this user. The access manager extracts the user's ID from the security token, and passes that along with the target application ID over a secure, trusted connection 1525 to RACF 1535 (or a similar host access agent). RACF obtains a passticket for this user, and returns it to the access manager, which makes it available to servlet 1520. Servlet 1520 then initiates a TN3270 session 1540 to a TN3270 server component 1550, through which it can communicate with the target host application 1545. When the host application 1545 sends its sign-on screen in the 3270 data stream, the servlet (which is adapted for locating fields in a data stream from this host application) locates the position where the user ID and passticket values should be placed, inserts them there, and returns the data stream over session 1540. Upon receiving the data stream from the TN3270 server, the host application sends the user ID and passticket to RACF for authentication. This authentication will typically succeed, and the application then begins interacting with servlet 1520. Note that this servlet is adapted for forwarding appropriate information to the user, who is interacting with browser 1500, and for receiving incoming messages from the browser. As in the other embodiments, the user achieves seamless and transparent access to the legacy applications from his Web-based client, over its secure session 1505.

Fifth Preferred Embodiment

Figure 16:
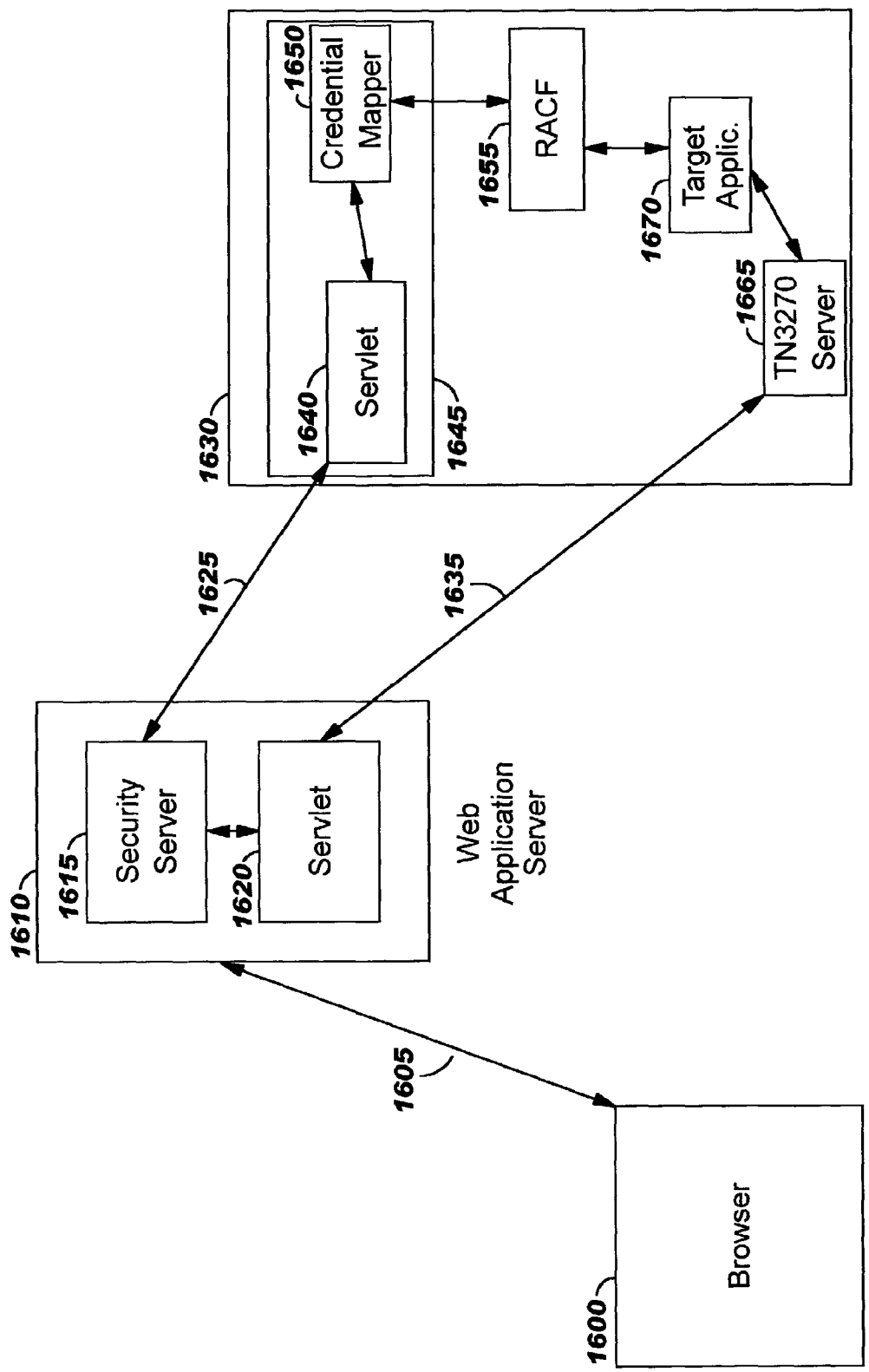

The fifth preferred embodiment also places the emulator client on a Web application server, such that the Web application server functions as a proxy for the Web client, and is illustrated in FIG. 16. As in the second preferred embodiment, this fifth preferred embodiment is useful in environments that do not have an access manager that can request passtickets. Therefore, a servlet 1640 and a credential mapper function 1650 are used to handle the passticket request, as will now be described.

As in the second preferred embodiment, a security server component 1615 executes on a Web application server 1610. The browser 1600 initiates a secure session 1605 with the Web application server, providing the user's ID and password. The Web application server authenticates the user using this information, and stores the security token for later use. When the user indicates his desire to interact with the host system 1630, an HTTP request is transmitted from browser 1600 over a connection 1605 to a servlet 1620 executing in Web application server 1610. Preferably, servlet 1610 then requests that the security server retrieve a passticket from RACF. (Alternatively, the servlet 1610 may perform this function.)

The security server 1615 extracts the user ID of the currently-signed-on user from the security token, and passes this user ID over a secure, trusted session 1625 to a servlet 1640 executing on target host 1630. (Alternatively, the security token itself may be passed to servlet 1640, if that servlet is adapted for extracting the user ID.) Servlet 1640 then contacts a credential mapper component 1650, requesting a passticket. As in the second preferred embodiment, servlet 1640 and credential mapper 1650 may both be running on a Web application server 1645, which itself is executing on the target host 1630.

The message sent from servlet 1640 to credential mapper 1650 preferably includes the application ID of the selected legacy application and the user's Web ID. The credential mapper may then map the Web ID to the user's legacy host ID, and the credential mapper then forwards these values to RACF 1355 with a request to generate a passticket; or, the credential mapper may pass the Web ID to RACF in appropriate scenarios (such as when the Web IDs are identical to the legacy host IDs), along with the application ID. In either case, the generated passticket is returned to the credential mapper, which in turn forwards it to servlet 1640.

The servlet, in turn, forwards the passticket back to the security server 1615 over connection 1625. The security server then makes this passticket value available to servlet 1620, which establishes a secure TN3270 session 1635 to a TN3270 server 1665 executing on the target host 1630, which will enable communicating with the target host application 1670. The target host application is invoked, and sends its sign-on screen in the 3270 data stream to TN3270 server 1665, which forwards a TN3270 data stream to servlet 1620 over session 1635. Upon receiving this data stream, the servlet 1620 (which is adapted for locating fields in a data stream from this host application) locates the position where the user ID and passticket values should be placed, inserts them there, and returns the data stream over session 1635. When the host application receives these values, it sends them to RACF for authentication. Following a successful authentication, the application then begins interacting with servlet 1620, which forwards appropriate information to the user receives incoming messages from the user's browser. Data then flows over sessions 1605, 1635 as in the prior art.

Sixth Preferred Embodiment

Figure 17:
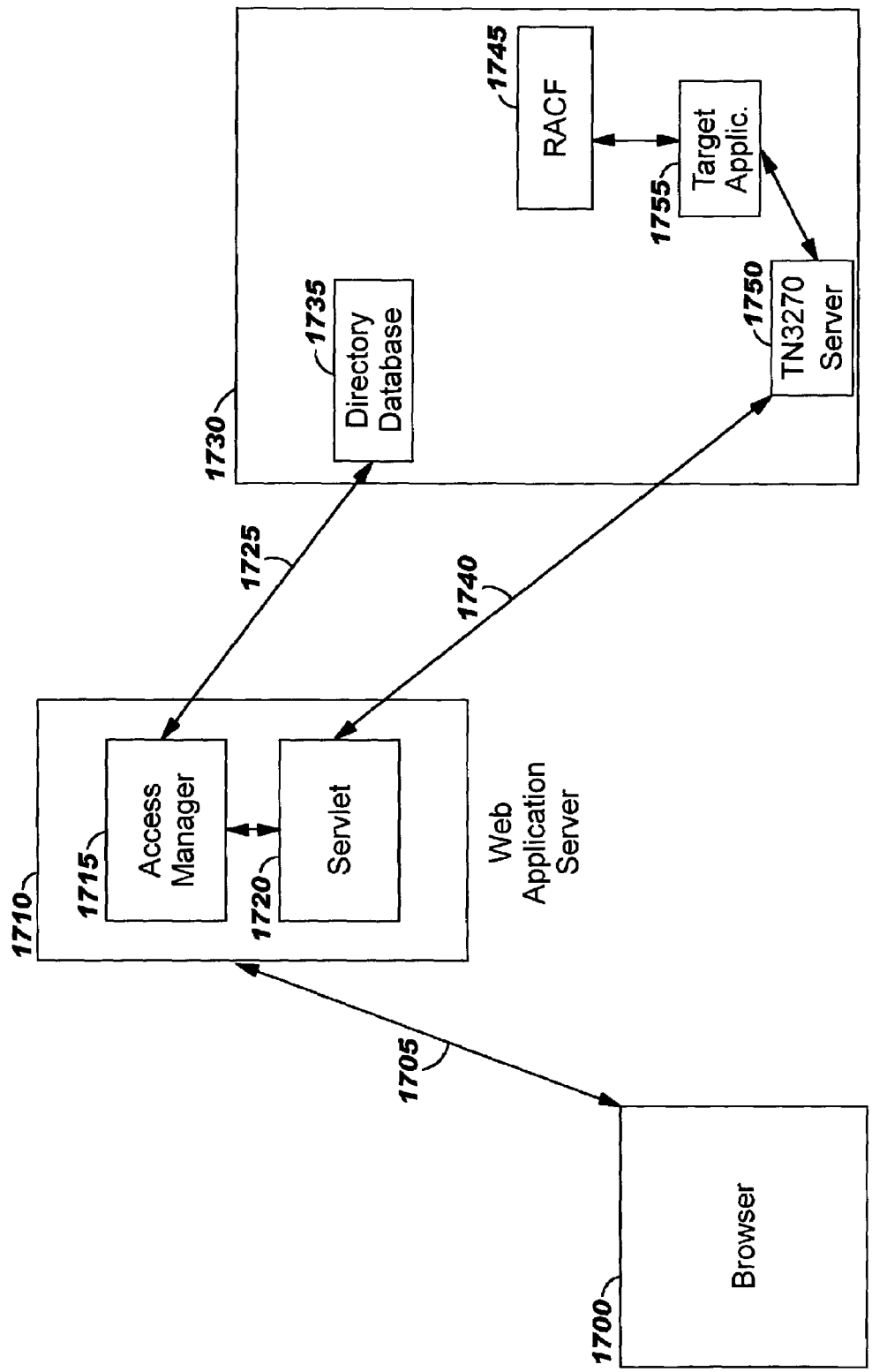

The sixth preferred embodiment also places the emulator client on a Web application server, such that the Web application server functions as a proxy for the Web client, and is illustrated in FIG. 17. As in the third preferred embodiment, this sixth preferred embodiment is useful in environments that do not support passtickets, and therefore the user's credentials are retrieved from a lockbox. This embodiment will be described with reference to the components in FIG. 17.

Browser 1700 first establishes a secure session 1705 to Web application server 1710, and access manager 1715 authenticates the user with his user ID and password (or similar identifying information). When the user requests to access a legacy application, the browser sends an HTTP request, which reaches a servlet 1720 executing on Web application server 1710. Servlet 1720 then requests that the access manager retrieve this user's password. In response, the access manager retrieves the user's ID from the security token, and sends this user ID and the ID of the selected application (or of each potential application, as described with reference to the second aspect of the first preferred embodiment) over a secure, trusted connection 1725 to a directory database component 1735. The directory database component then retrieves the user's password (or password substitute) from the lockbox, and returns it to the access manager. (For purposes of illustration only, the directory database component is shown as being located on the same target host 1730 as the target legacy application 1755.)

The access manager then returns the password to the servlet 1720, and the servlet initiates a TN3270 session 1740 to a TN3270 server 1750 operating on target host 1730. (As will be obvious, the session establishment may begin prior to receiving the passticket for the selected application, and thus a strict ordering of operations is not implied by the discussions of this function.) An identifier of the target application 1755 is transmitted over this session 1740, causing the target application to return its sign-on screen or similar start-up information. When this data stream is received at servlet 1720, the servlet locates the position where the user ID and password values are expected, and inserts the values it received from the access manager. The servlet (which is functioning as a TN3270 client) returns this data stream over session 1740, and upon receiving it, the target application 1755 sends the user ID and password to RACF 1760 for authentication. Assuming that the user is successfully authenticated, he can then interact with the legacy application using prior art techniques, without having to manually provide his user ID and password.

While several preferred embodiments of the present invention has been described, additional variations and modifications in those embodiments may occur to those skilled in the art once they learn of the basic inventive concepts. In particular, alternative data streams (such as a 5250 data stream or a VT data stream) may be used which provide the communications between the user's modem computer system and the legacy host applications and data. Further, security software other than the IBM RACF software may be used for protecting host-based assets, and techniques other than the TN3270 protocol may be used to convey information between the client and server provided that functionality equivalent to that described herein is supported. Therefore, it is intended that the appended claims shall be construed to include both the preferred embodiment and all such variations and modifications as fall within the spirit and scope of the invention.

What is claimed is:

1. A method of integrating legacy access with single sign-on in a distributed computing environment, comprising steps of:

establishing a first secure session from a client on a user's workstation to a server, wherein the secure session establishment authenticates the user's identity from identifying information passed from the client;

storing the identifying information in a security token accessible to the server; and using the identifying information stored in the security token to authenticate the user for access to a legacy host application or system, whereby the authentication occurs programmatically and does not require the user to re-enter his identifying information, wherein the step of using the identifying information further comprises the steps of:

requesting a legacy host access agent to generate a password substitute, based on the user's identifying information from the security token and an identifier of the legacy host application or system;

passing the password substitute and a legacy host identifier of the user to the client on the user workstation;

establishing a second secure session between an emulator client operating on the user's workstation and an emulator server on a host where the legacy host application or system will be accessible;

receiving a sign-on data stream from the legacy host application or system at the emulator client over the second secure session;

programmatically inserting the password substitute and the legacy host identifier into the sign-on data stream, creating a modified data stream;

returning the modified data stream from the emulator client to the emulator server, over the second secure session; and sending, by the legacy host application or system, the password substitute and the legacy host identifier to the legacy host access agent for transparently authenticating the user.

2. The method as claimed in claim 1, wherein the emulator client is downloaded dynamically to the user workstation, responsive to determining that the user wishes to execute legacy host applications and/or systems.

3. The method as claimed in claim 1, wherein the step of using the identifying information further comprises the steps of:

retrieving the user's password from secure storage over a trusted secure connection, based on the user's identifying information from the security token and an identifier of the legacy host application or system;

passing the password and a legacy host identifier of the user to the client on the user workstation;

establishing a second secure session between an emulator client operating on the user's workstation and an emulator server on a host where the legacy host application or system will be accessible;

receiving sign-on data stream from the legacy host application or system at the emulator client over the second secure session;

programmatically inserting the password and the legacy host identifier into the sign-on data stream, creating a modified data stream;

returning the modified data stream from the emulator client to the emulator server, over the second secure session; and sending, by the legacy host application or system, the password and the legacy host identifier to the legacy host access agent for transparently authenticating the user.

4. The method as claimed in claim 1, wherein the step of using the identifying information further comprises the steps of:

requesting a legacy host access agent to generate a password substitute, based on the user's identifying information from the security token and an identifier of the legacy host application or system;

passing the password substitute and a legacy host identifier of the user to an emulator client at the server, where this emulator client operates as a proxy for the client on the user's workstation;

establishing a second secure session between the emulator client and an emulator server on a host where the legacy host application or system will be accessible;

receiving a sign-on data stream from the legacy host application or system at the emulator client over the second secure session;

programmatically inserting the password substitute and the legacy host identifier into the sign-on data stream, creating a modified data stream;

returning the modified data stream from the emulator client to the emulator server, over the second secure session; and sending, by the legacy host application or system, the password substitute and the legacy host identifier to the legacy host access agent for transparently authenticating the user.

5. The method as claimed in claim 1, wherein the step of using the identifying information further comprises the steps of:

retrieving the user's password from secure storage over a trusted secure connection, based on the user's identifying information from the security token and an identifier of the legacy host application or system;

passing the password and a legacy host identifier of the user to an emulator client at the server, where this emulator client operates as a proxy for the client on the user's workstation;

establishing a second secure session between the emulator client and an emulator server on a host where the legacy host application or system will be accessible;

receiving a sign-on data stream from the legacy host application or system at the emulator client over the second secure session;

programmatically inserting the password and the legacy host identifier into the sign-on data stream, creating a modified data stream;

returning the modified data stream from the emulator client to the emulator server, over the second secure session; and sending, by the legacy host application or system, the password and the legacy host identifier to the legacy host access agent for transparently authenticating the user.

6. A computer program product for integrating legacy access with single sign-on in a distributed computing environment, the computer program product embodied on one or more computer-readable media and comprising:

computer-readable program code means for establishing a first secure session from a client on a user's workstation to a server, wherein the secure session establishment authenticates the user's identity from identifying information passed from the client;

computer-readable program code means for storing the identifying information in a security token accessible to the server; and computer-readable program code means for using the identifying information stored in the security token to authenticate the user for access to a legacy host application or system, whereby the authentication occurs programmatically and does not require the user to re-enter his identifying information, wherein the computer-readable program code means for using the identifying information further comprises:
  computer-readable program code means for requesting a legacy host access agent to generate a password substitute, based on the user's identifying information from the security token and an identifier of the legacy host application or system;
  computer-readable program code means for passing the password substitute and a legacy host identifier of the user to the client on the user workstation;
  computer-readable program code means for establishing a second secure session between an emulator client operating on the user's workstation and an emulator server on a host where the legacy host application or system will be accessible;
  computer-readable program code means for receiving a sign-on data stream from the legacy host application or system at the emulator client over the second secure session;
  computer-readable program code means for programmatically inserting the password substitute and the legacy host identifier into the sign-on data stream, creating a modified data stream;
  computer-readable program code means for returning the modified data stream from the emulator client to the emulator server, over the second secure session; and
  computer-readable program code means for sending, by the legacy host application or system, the password substitute and the legacy host identifier to the legacy host access agent for transparently authenticating the user.

7. The computer program product as claimed in claim 6, wherein the emulator client is downloaded dynamically to the user workstation, responsive to determining that the user wishes to execute legacy host applications and/or systems.

8. The computer program product as claimed in claim 6, wherein the computer-readable problem code means for using the identifying information further comprises:
  computer-readable program code means for retrieving the user's password from secure storage over a trusted secure connection, based on the user's identifying information from the security token and an identifier of the legacy host application or system;
  computer-readable program code means for passing the password and a legacy host identifier of the user to the client on the user workstation;
  computer-readable program code means for establishing a second secure session between an emulator client operating on the user's workstation and an emulator server on a host where the legacy host application or system will be accessible;
  computer-readable program code means for receiving a sign-on data stream from the legacy host application or system at the emulator client over the second secure session;
  computer-readable program code means for programmatically inserting the password and the legacy host identifier into the sign-on data stream, creating a modified data stream;
  computer-readable program code means for returning the modified data stream from the emulator client to the emulator server, over the second secure session; and
  computer-readable program code means for sending, by the legacy host application or system, the password and the legacy host identifier to the legacy host access agent for transparently authenticating the user.

9. The computer program product as claimed in claim 6, wherein the computer-readable program code means for using the identifying information further comprises:
  computer-readable program code means for requesting a legacy host access agent to generate a password substitute, based on the user's identifying information from the security token and an identifier of the legacy host application or system;
  computer-readable program code means for passing the password substitute and a legacy host identifier of the user to an emulator client at the server, where this emulator client operates as a proxy for the client on the user's workstation;
  computer-readable program code means for establishing a second secure session between the emulator client and an emulator server on a host where the legacy host application or system will be accessible;
  computer-readable program code means for receiving a sign-on data stream from the legacy host application or system at the emulator client over the second secure session;
  computer-readable program code means for programmatically inserting the password substitute and the legacy host identifier into the sign-on data stream, creating a modified data stream;
  computer-readable program code means for returning the modified data stream from the emulator client to the emulator server, over the second secure session; and
  computer-readable program code means for sending, by the legacy host application or system, the password substitute and the legacy host identifier to the legacy host access agent for transparently authenticating the user.

10. The computer program product as claimed in claim 6, wherein the computer-readable program code means for using the identifying information further comprises:
  computer-readable program code means for retrieving the user's password from secure storage over a trusted secure connection, based on the user's identifying information from the security token and an identifier of the legacy host application or system;
  computer-readable program code means for passing the password and a legacy host identifier of the user to an emulator client at the server, where this emulator client operates as a proxy for the client on the user's workstation;
  computer-readable program code means for establishing a second secure session between the emulator client and an emulator server on a host where the legacy host application or system will be accessible;
  computer-readable program code means for receiving a sign-on data stream from the legacy host application or system at the emulator client over the second secure session;
  computer-readable program code means for programmatically inserting the password and the legacy host identifier into the sign-on data stream, creating a modified data stream;
  computer-readable program code means for returning the modified data stream from the emulator client to the emulator server, over the second secure session; and
  computer-readable program code means for sending, by the legacy host application or system, the password and the legacy host identifier to the legacy host access agent for transparently authenticating the user.

* * * * *